(12) United States Patent
L'Heureux

(10) Patent No.: US 7,028,041 B2
(45) Date of Patent: Apr. 11, 2006

(54) METHODS AND APPARATUS FOR DATABASE SPACE CALCULATION AND ERROR DETECTION

(75) Inventor: Guy Alan L'Heureux, Springdale, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 646 days.

(21) Appl. No.: 09/997,133

(22) Filed: Nov. 29, 2001

(65) Prior Publication Data

US 2003/0101193 A1    May 29, 2003

(51) Int. Cl.
*G06F 7/06* (2006.01)

(52) U.S. Cl. .................. 707/101; 707/205; 707/102

(58) Field of Classification Search ........ 707/100–102, 707/205
See application file for complete search history.

(56) References Cited

U.S. PATENT DOCUMENTS

| | | | | |
|---|---|---|---|---|
| 4,751,702 A | * | 6/1988 | Beier et al. | 714/13 |
| 4,945,475 A | * | 7/1990 | Bruffey et al. | 707/1 |
| 5,155,678 A | * | 10/1992 | Fukumoto et al. | 707/202 |
| 5,644,766 A | * | 7/1997 | Coy et al. | 707/204 |
| 5,678,044 A | * | 10/1997 | Pastilha et al. | 707/104.1 |
| 5,761,667 A | * | 6/1998 | Koeppen | 707/101 |
| 6,012,032 A | * | 1/2000 | Donovan et al. | 705/1 |
| 6,055,602 A | | 4/2000 | McIlvain et al. | |
| 6,115,781 A | | 9/2000 | Howard | |
| 6,505,217 B1 | * | 1/2003 | Venkatraman et al. | 707/205 |
| 6,622,142 B1 | * | 9/2003 | Murray et al. | 707/100 |
| 6,636,879 B1 | * | 10/2003 | Doucette et al. | 707/205 |
| 6,643,754 B1 | * | 11/2003 | Challenger et al. | 711/171 |
| 2003/0046294 A1 | * | 3/2003 | Heronimus | |

* cited by examiner

*Primary Examiner*—Greta Robinson
*Assistant Examiner*—Sathyanarayan Pannala
(74) *Attorney, Agent, or Firm*—Priest & Goldstein

(57) ABSTRACT

Techniques for more accurately analyzing the additional capacity of very large hierarchical databases are described. More particularly, techniques and tools for looking at physical sequential data files, such as the OSAM files used in IMS databases, to determine how much file space an IMS OSAM dataset is using are described. These tools may be effectively utilized to generate appropriate reports if the database is running out of space, thereby allowing a user to take proactive steps.

23 Claims, 30 Drawing Sheets

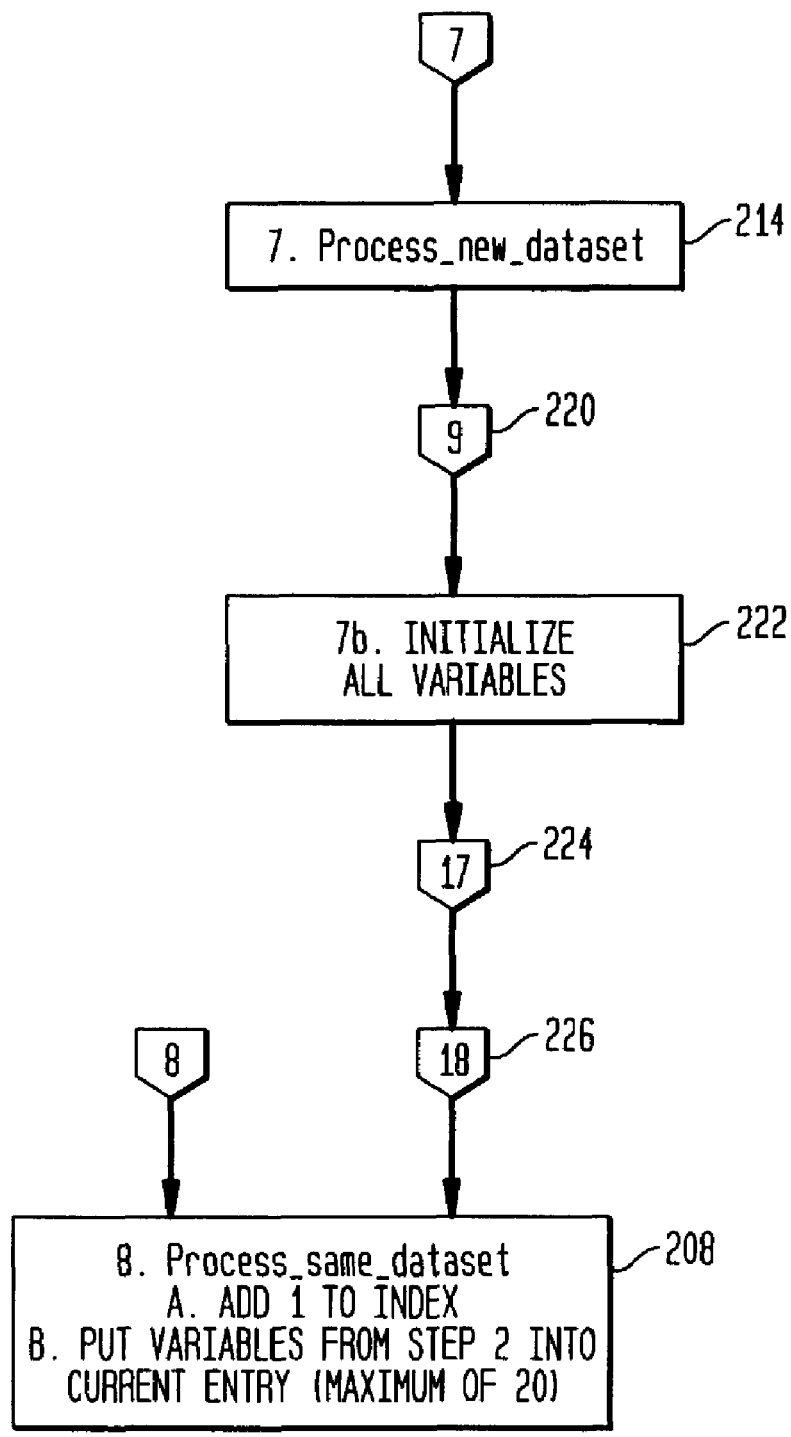

FIG. 8

From:
To:
Sent: Monday, November 26, 2001 4:25 PM
Subject: Sample Report  ⎫_802
WARNING Dataset Name: V1.IMS.DB01.DATABASE Is over the USED
space threshold total KB Alloc=7968376 total KB Used=5204843
808—Percent Used 65.31                    804                      806
WARNINGDataset Name: V1.IMS.DB05.DATABASE Is over the
USED space threshold total KB Alloc=7636360 total KB Used=6354835
Percent Used 83.21
WARNING Dataset Name: V1.IMS.DB02.DATABASE Is over the
USED space threshold total KB Alloc = 7636360 total KB Used=6417696
Percent Used 84.04
WARNING Dataset Name: V1.IMS.DB041.DATABASE Is over the
USED space threshold total KB Alloc=5312250 total KB Used=5264938
Percent Used 99.10
WARNING Dataset Name: V1.IMS.DB042.DATABASE Is over the
USED space threshold total KB Alloc=7636360 total KB Used=6603791
Percent Used 86.47
CRITICALDataset V1.IMS.DB043.DATABASE cannot take one
extent on vol GTV001 alloc 7636360 Used 6603791 %USED 86.47
WARNINGDataset Name: V1.IMS.DB03.DATABASE Is over the
USED space threshold total KB Alloc=7636360 total KB Used=5216796
Percent Used 68.31

* END OF REPORT *

METHODS AND APPARATUS FOR DATABASE SPACE CALCULATION AND ERROR DETECTION

FIELD OF THE INVENTION

The present invention relates generally to improved techniques for more accurately analyzing the additional capacity of hierarchical databases, such as those utilizing the IMS™ management software from IBM. More particularly, the present invention provides tools to look at physical sequential data files, such as the OSAM files used in IMS databases, to determine how much file space an IMS OSAM dataset, for example, is using in multiple virtual storage (MVS) or on a mainframe computer to proactively determine if the database is running out of space, thereby allowing a user to take steps to prevent the problems incumbent when a database runs out of space.

BACKGROUND OF THE INVENTION

By way of example, if an IMS OSAM database exceeds a predefined system maximum capacity, such as about 8.4 gigabytes (Gb) or 8.4 billion bytes, it will fail and stop functioning. At the time the present invention was made, there was not a readily available way to be proactive and prevent such failures from happening. Existing tools did not make the needed information available. In fact, it was determined that existing interactive system productive facility (ISPF) and interactive storage management facility (ISMF) tools could not be reliably used for space determination for datasets guaranteed space because the dataset control blocks (DSCBs) were not correctly updated, as discussed further below. Regardless of the predefined system capacity, most users will want to accurately know when system limits are being approached so that proactive steps can be taken.

A product that came with BMC IMS utilities was located, but that product was particular to its own internal processes during execution of the BMC IMS utilities and built its processes thereupon. Consequently, this product was not applicable to IMS OSAM systems and the like.

SUMMARY OF THE INVENTION

In light of the above, there was a critical need for tools to address the problems presented by the specific context of IMS OSAM datasets in particular and large hierarchical databases utilizing very large physical sequential files in general.

Among its several aspects, the present invention provides techniques for accurately monitoring the order in which a large hierarchical database is stored to multiple disks, adjusting the percentage volume full or the measure of disk fullness to reflect that when a second or subsequent disk is full or partially full then a first disk is or previously filled disks are full, and automatically reporting when a threshold volume is exceeded so that a user can respond as appropriate. In the specific context of an IMS OSAM dataset, by looking at a DCOLLECT listing, determining the data attributes of the dataset, such as whether it is guaranteed space, the volumes or disks that the dataset is on, and the order in which the dataset is allocated to the volumes, an actual file size is determined, as well as how close that size is to approaching the limit of approximately 8.4 Gb. Appropriate reports are then generated.

These and other features, aspects, and advantages of the invention will be apparent to those skilled in the art from the following detailed description taken together with the accompanying drawings.

BRIEF DESCRIPTION OF THE DRAWINGS

FIG. 8 is an illustrative report which may be generated by the system and methods of the above Figs. to provide a notification to a user that a database is over a used space threshold.

DETAILED DESCRIPTION

The present invention addresses methods and apparatus for analyzing IMS databases on a mainframe computer, and specifically looking at the OSAM files that are associated with those databases. As indicated above, if an IMS OSAM database exceeds a designed maximum capacity, such as approximately 8.4 Gb, it will fail and stop functioning. Before turning to the details of a presently preferred IMS OSAM free space monitor in accordance with the present invention, the following definitions are provided:

IMS—A hierarchical database management software product from IBM.

OSAM—A physical sequential file that is used specifically by an IMS database.

SMS—System managed storage software from IBM that manages the placement of files in physical volumes of a mainframe computer.

IDCAMS—A utility from IBM that provides catalog and volume information as well as basic information about physical files.

DCOLLECT—A feature of IDCAMS that will return a file containing volume information and attributes about the files.

GTS—Guaranteed space is a feature of SMS that allows a file to be allocated specifically on specific disk storage volumes.

ACS—The code that SMS uses to determine where a file is to physically be allocated.

LISTCAT—A feature of IDCAMS that will return information about a specific file of catalog.

IEHLIST—A utility that will return specific data about a particular volume. The data is similar to a DCOLLECT, but in a different format.

Data Class—An attribute of SMS that will assign certain characteristics to certain files. This attribute is used to group similar types of files together, in terms of their allocations. For example, all files that are defined as being guaranteed space will have a data class ending in "GTS" according to the presently preferred embodiment of the present invention.

Figure 1:
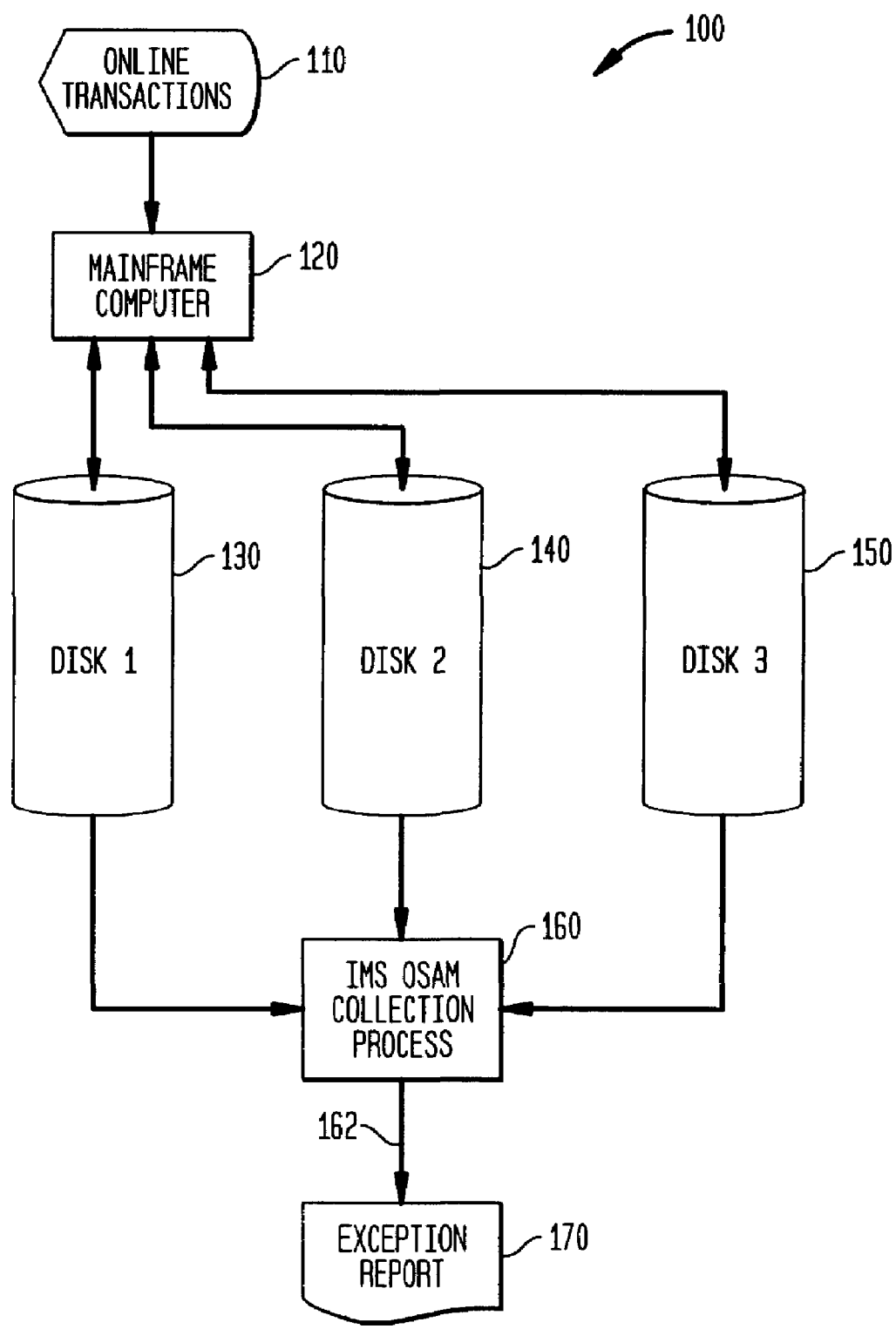
FIG. 1 illustrates a system in accordance with the present invention.

Turning to FIG. 1, this figure shows an IMS OSAM free space monitor system 100 in accordance with the present invention. System 100 includes a source of online transaction data 110, a mainframe computer 120, three disk storage memories, volumes, or disks 1, 2, and 3 130, 140, and 150, IMS OSAM collection process software 160 which includes standard IMS OSAM software modified to include the processes and subroutines taught in the present invention and discussed in detail below in connection with FIGS. 2A–2S, 3, 4A–4C, 5A and 5B, 6, 7A and 7B, and an exception report generator 170, such as a printer or display, for providing an exception report to a user, such as exemplary email report 800 shown in FIG. 8 and discussed further below. In operation, data is provided to mainframe computer 120 from a data source or sources, such as the source of online transaction data 110. While a single source is shown for simplicity, it will be recognized that this source is exemplary only and may be representative of a large number of sources, such as store data reported for each Wal-Mart stow, for example. To analyze such data, mainframe computer 120 employs database software. Large datasets are stored on one or more of the disks 130, 140, or 150 and processing is carried out As addressed in greater detail below, the present invention provides techniques for accurately determining when the combined storage limits of the disks 130, 140, and 150 are approached and generating a report to alert a user. In a presently preferred embodiment, IMS OSAM collection process 160 automatically emails a user over a communication link 162, such as an Internet or intranet connection, that an exception exists, for example, that a threshold has been exceeded, the user can print this report on a printer or display the report on the display of a personal computer or the like. More importantly, the user can take proactive steps to avoid exceeding the system memory capacity. For example, the user can purge data from the dataset or restructure it, for example, by splitting it.

On each of the disks 130, 140, and 150 is a volume table of contents (VTOC) that contains data about the files on that disk. DCOLLECT, a standard utility to extract information about physical files, as addressed further below, runs against all of the VTOC and gathers information about the physical files. IMS OSAM is a physical file that can span multiple volumes or disks. As an example, assume that each of the disks has 2,000 cylinders which can be allocated for storing a database or dataset. Assuming a first dataset requires 3,000 total cylinders of storage is to be stored to disk memory. Assuming the allocation begins with disk 130 and then proceeds to disk 140, then disk 130 will be 100% filled with data from the dataset. Disk 150 will be 0% filled with data from the dataset. Using tools existing prior to the present invention, disk 140 will correctly show it is 50% full, but disk 130 will show 0% in many or most cases.

Similarly, assuming a second dataset requires 5,000 total cylinders of storage. For this dataset, it is assumed that allocation begins with disk 150 and then proceeds to disks 130 and 140 in turn. The end result is that disks 130 and 150 are 100% full and disk 140 is 50% full. Again, using existing tools, the last disk having data stored, disk 140, correctly shows that it is 50% full. However, again in many cases, disks 130 and 150 which are full will be shown by the existing tools to be empty.

In simplified terms, the present invention determines the order in which the disks are filled, and knowing, for example, that if disk 140 is part full and that it was filled after disk 130, then adjusting the measure of fullness of disk 130 to 100%. With a correct measure of fullness of the three disks 130, 140, and 150, if a threshold is exceeded, an exception report is generated.

Returning to the two examples above with a threshold of 4,750 cylinders, for the first example, no report will be generated as only 3,000 cylinders are full. However, in the second example, using the present invention, it will be correctly determined that 5,000 cylinders have been filled and an exception report will be generated. With prior tools, for both examples, it is likely that disk 2 140 will be determined to be 50% full with disks 1 and 3 130 and 150, respectively, being incorrectly indicated to be empty, thereby, leading a user to inaccurately believe sufficient disk memory is available for 5,000 additional volumes of data, 1,000 in disk 140 and 2,000 each in disks 130 and 150.

Figure 2A:
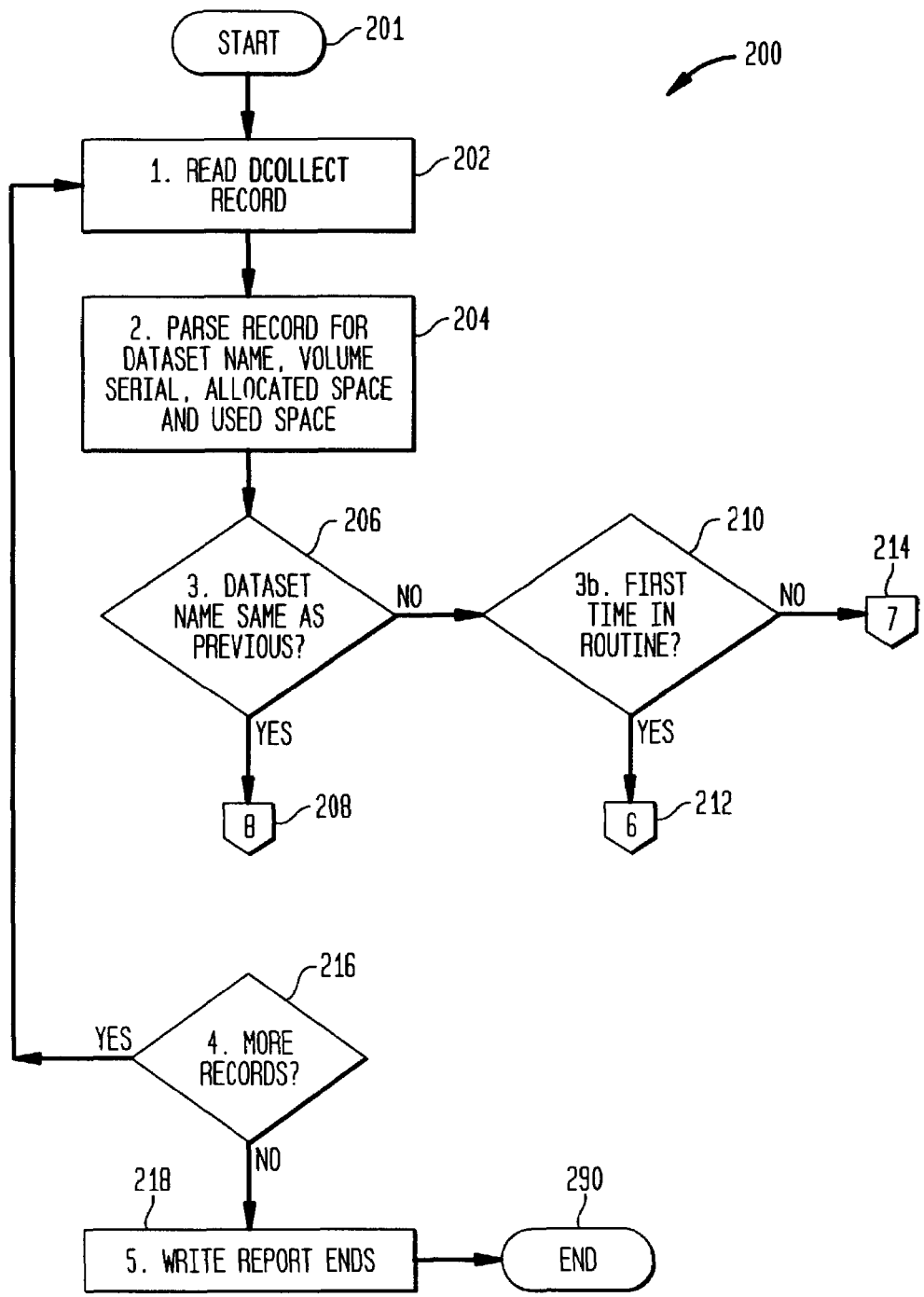
FIGS. 2A–2S illustrate a method of database space calculation and error detection in accordance with the present invention.
Figure 2B:
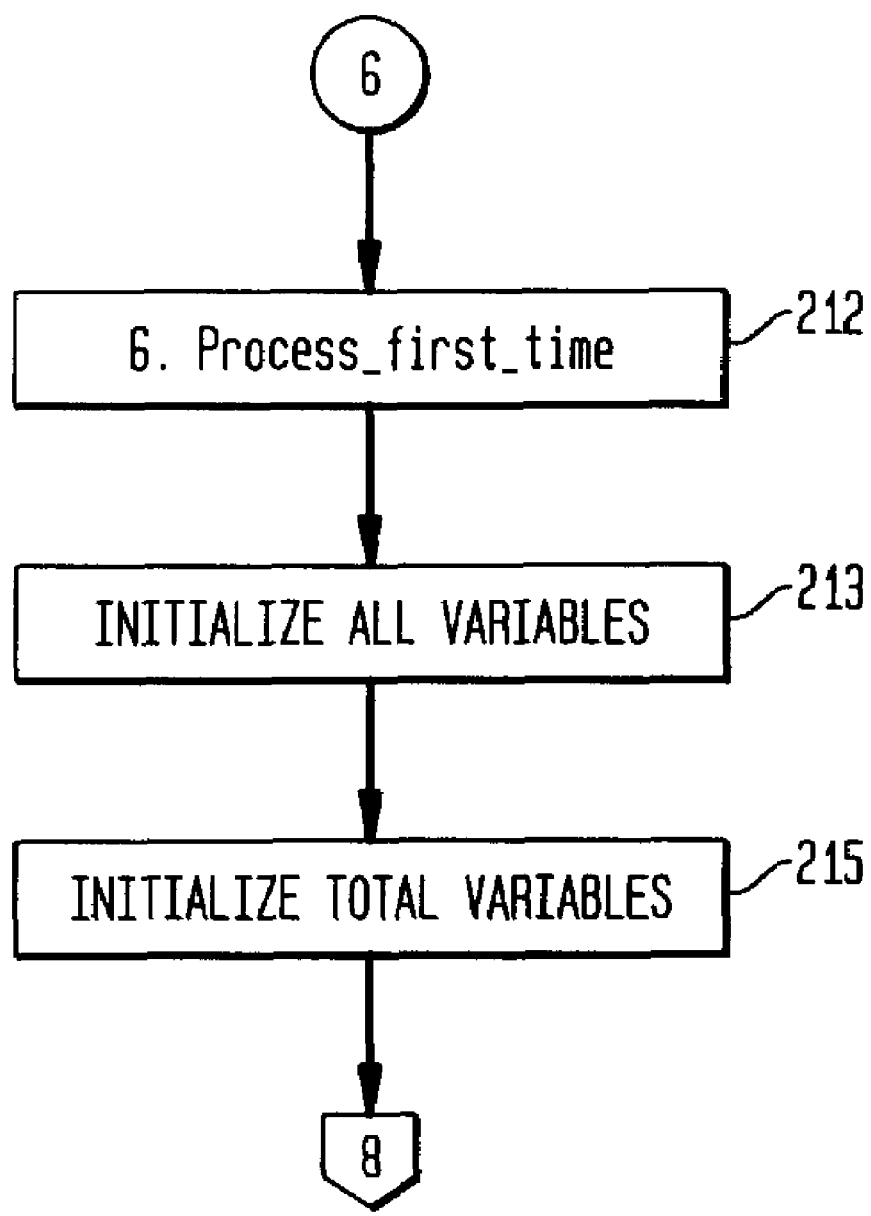
Figure 2D:
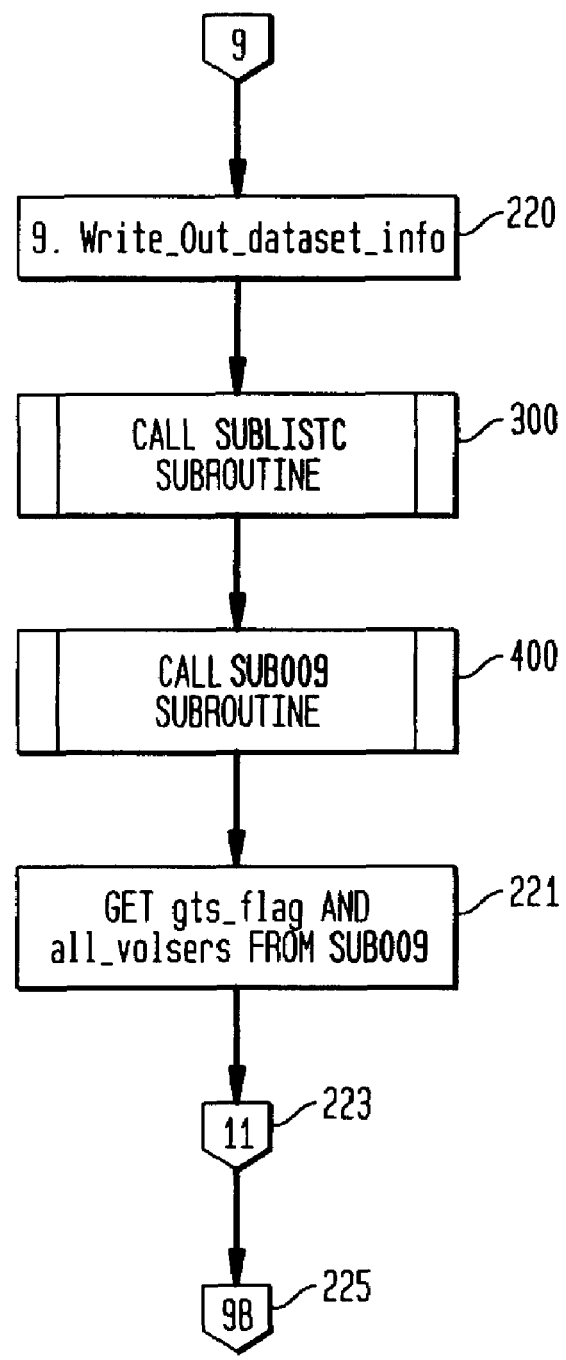
Figure 2E:
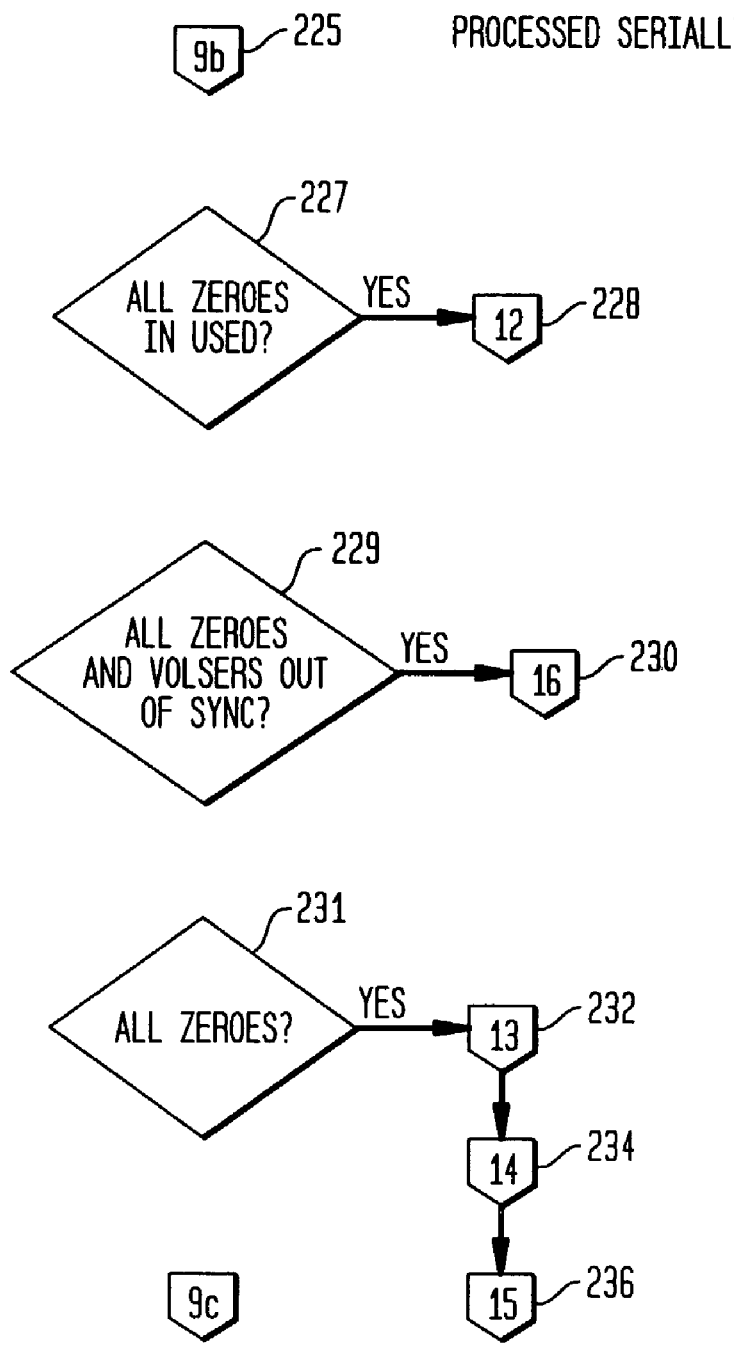
Figure 2F:
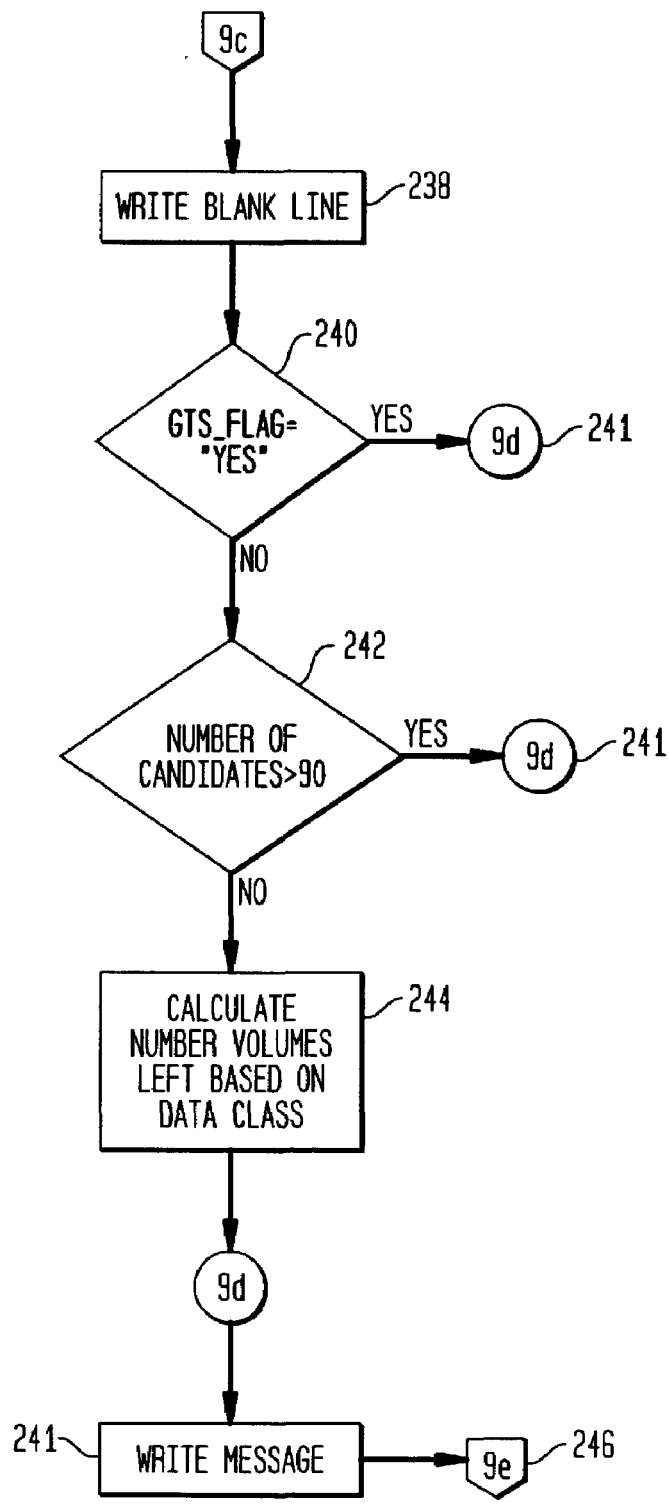
Figure 2G:
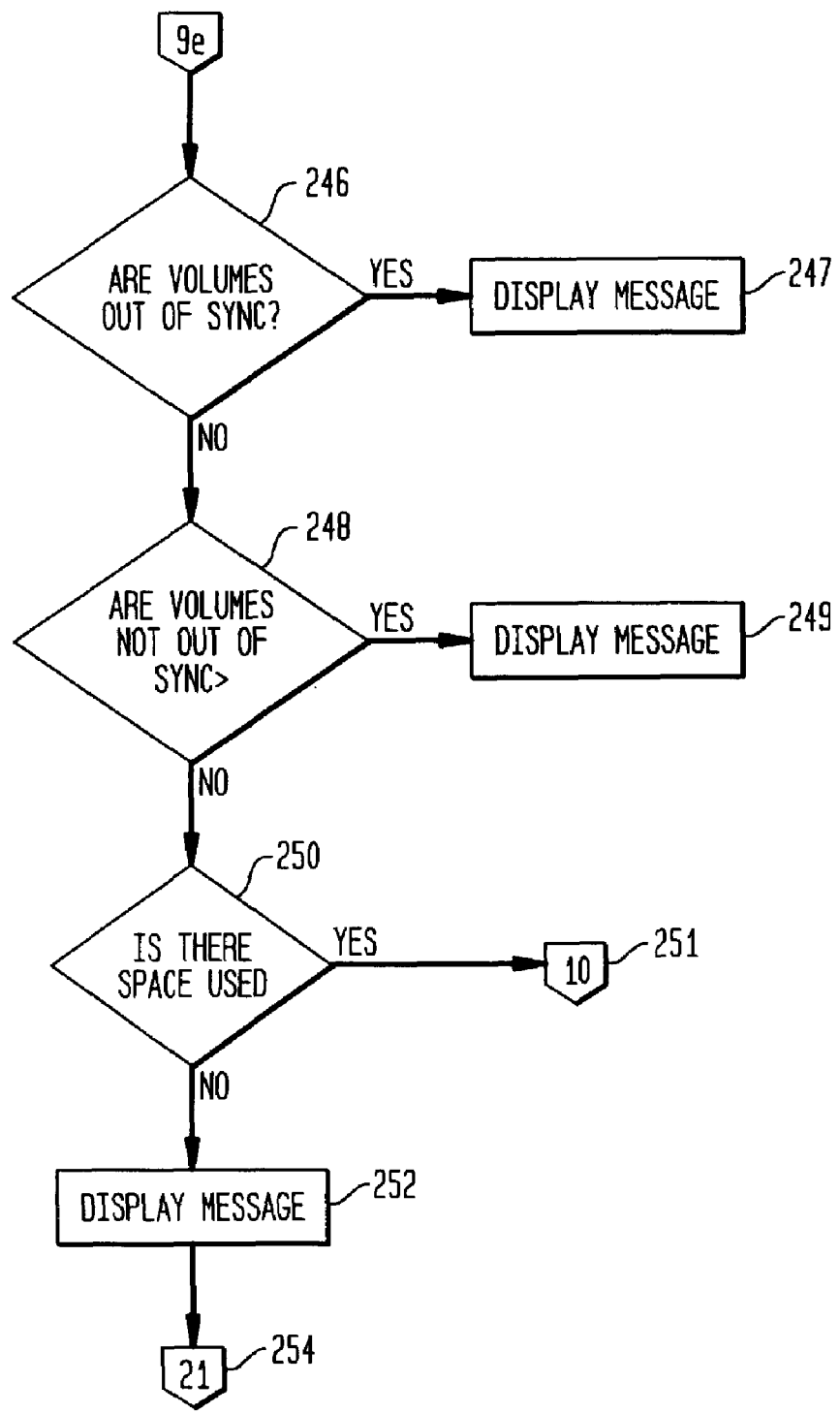
Figure 2H:
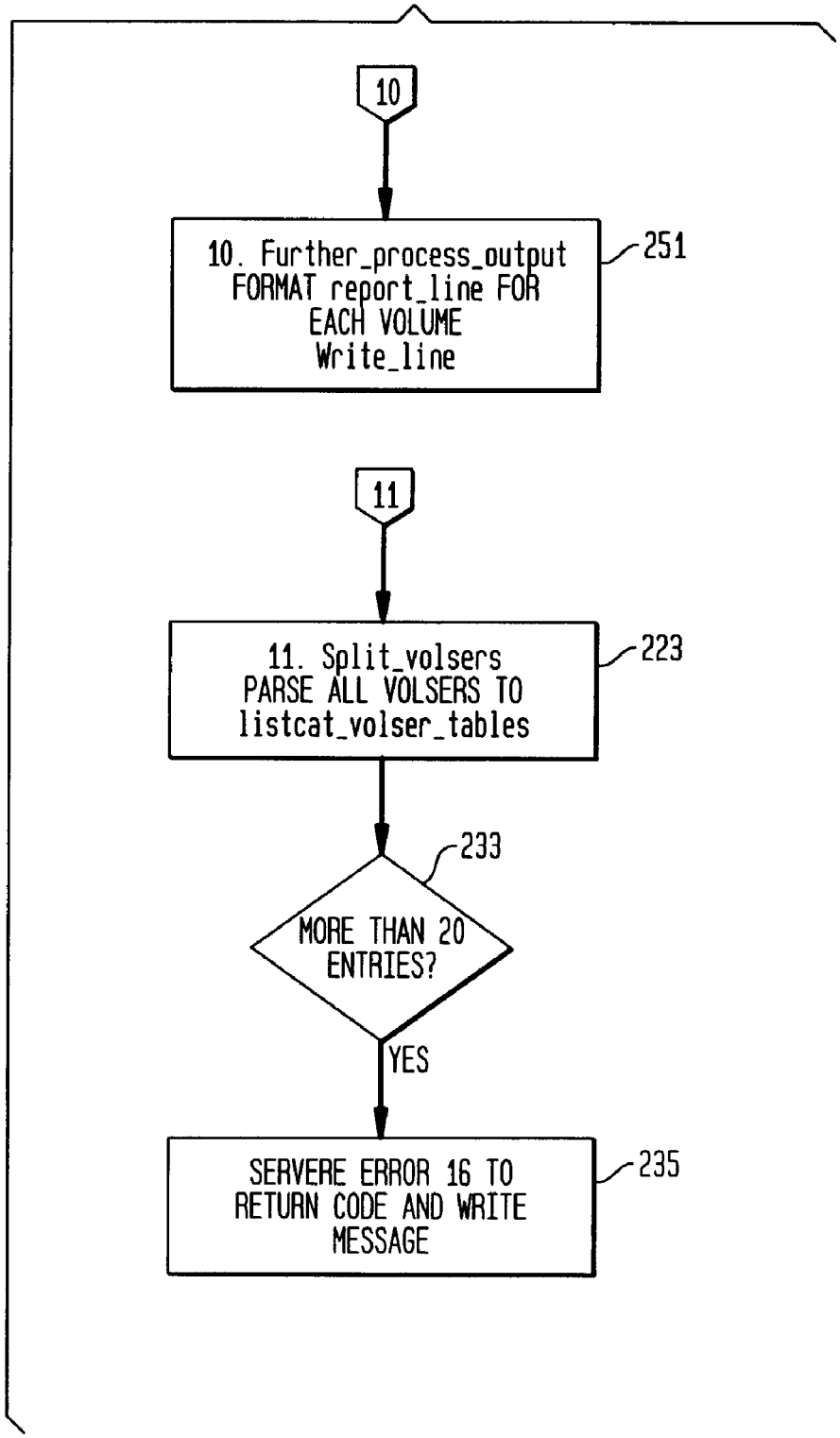
Figure 2I:
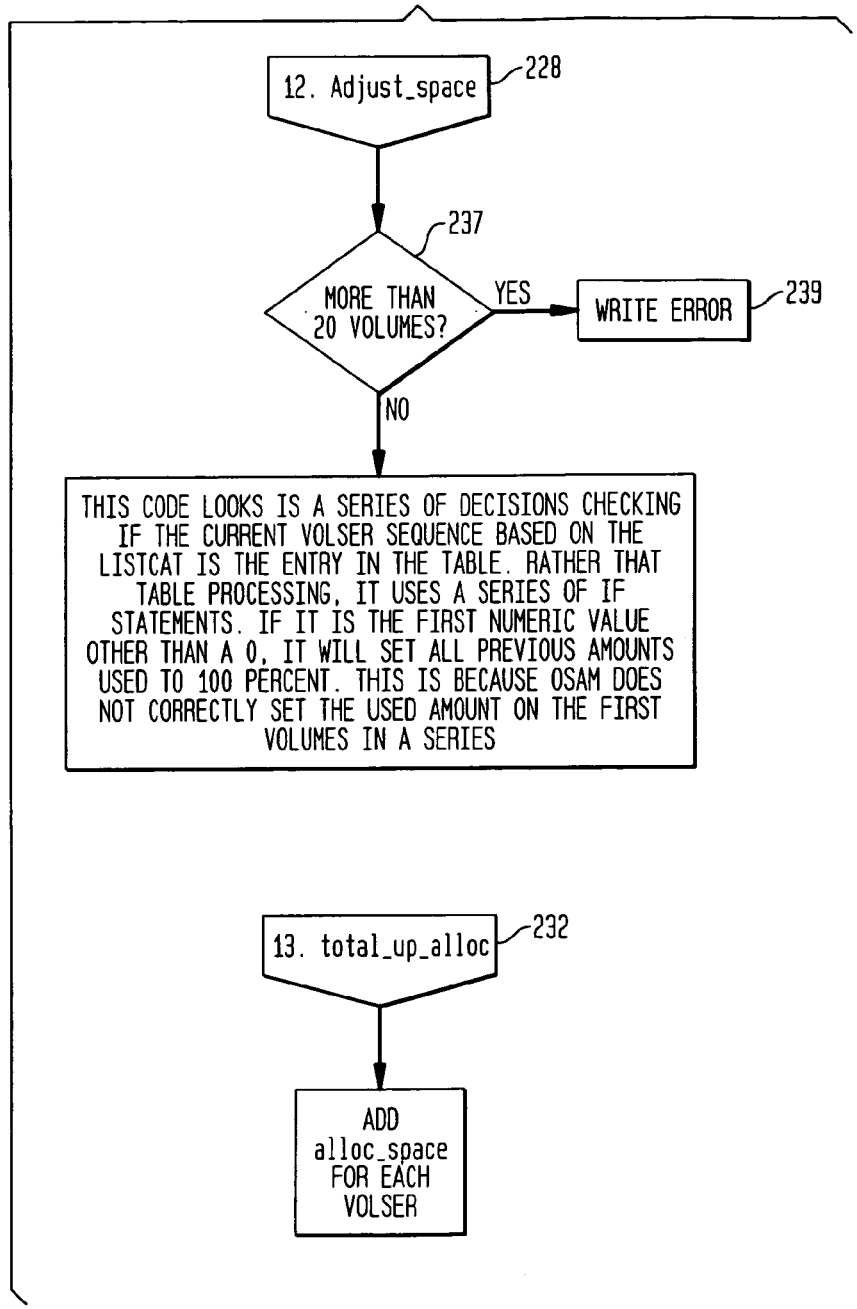
Figure 2J:
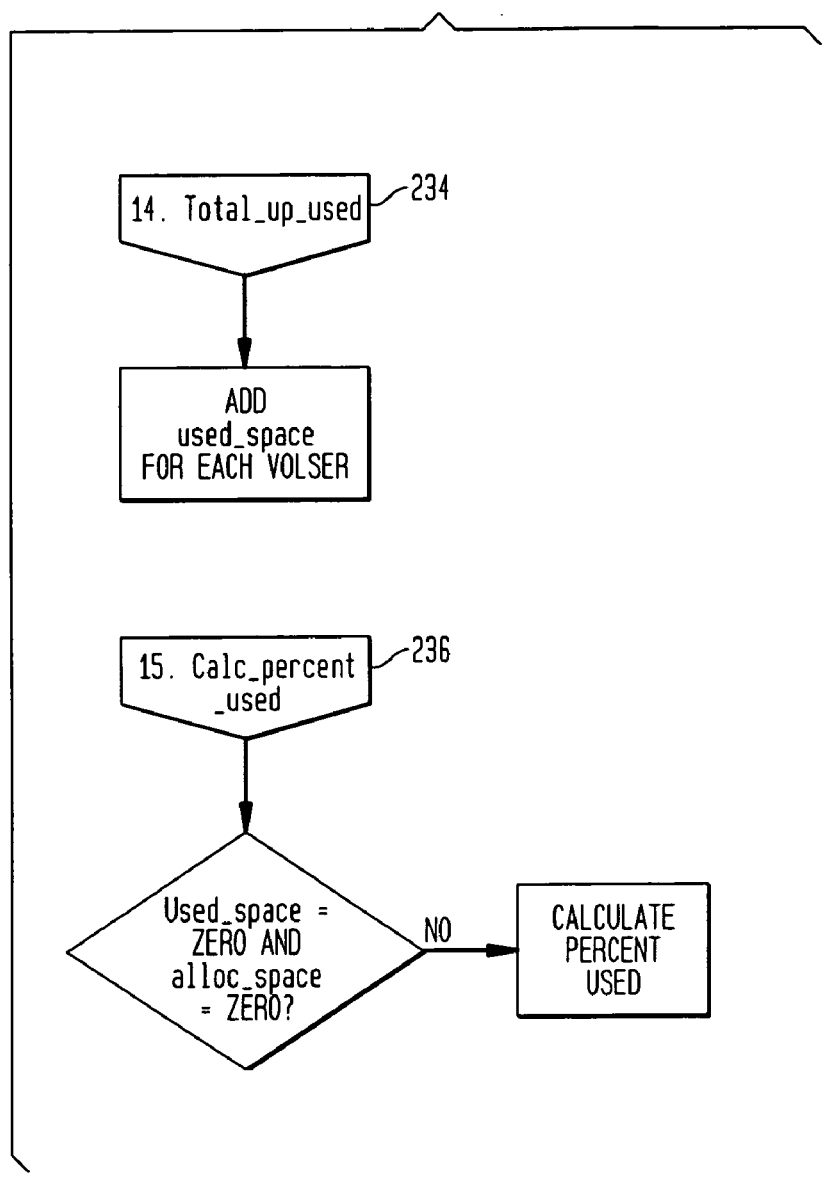
Figure 2K:
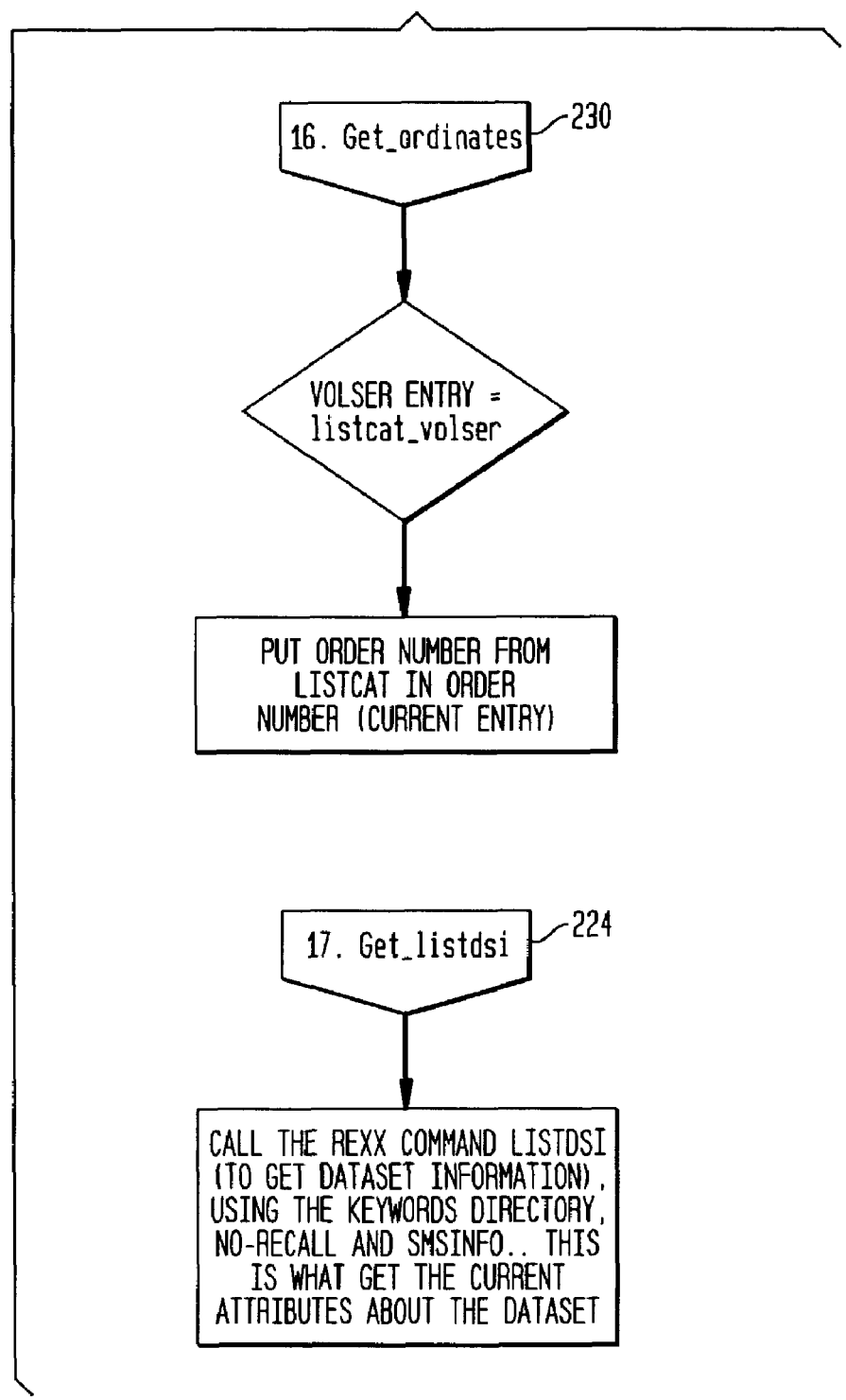
Figure 2L:
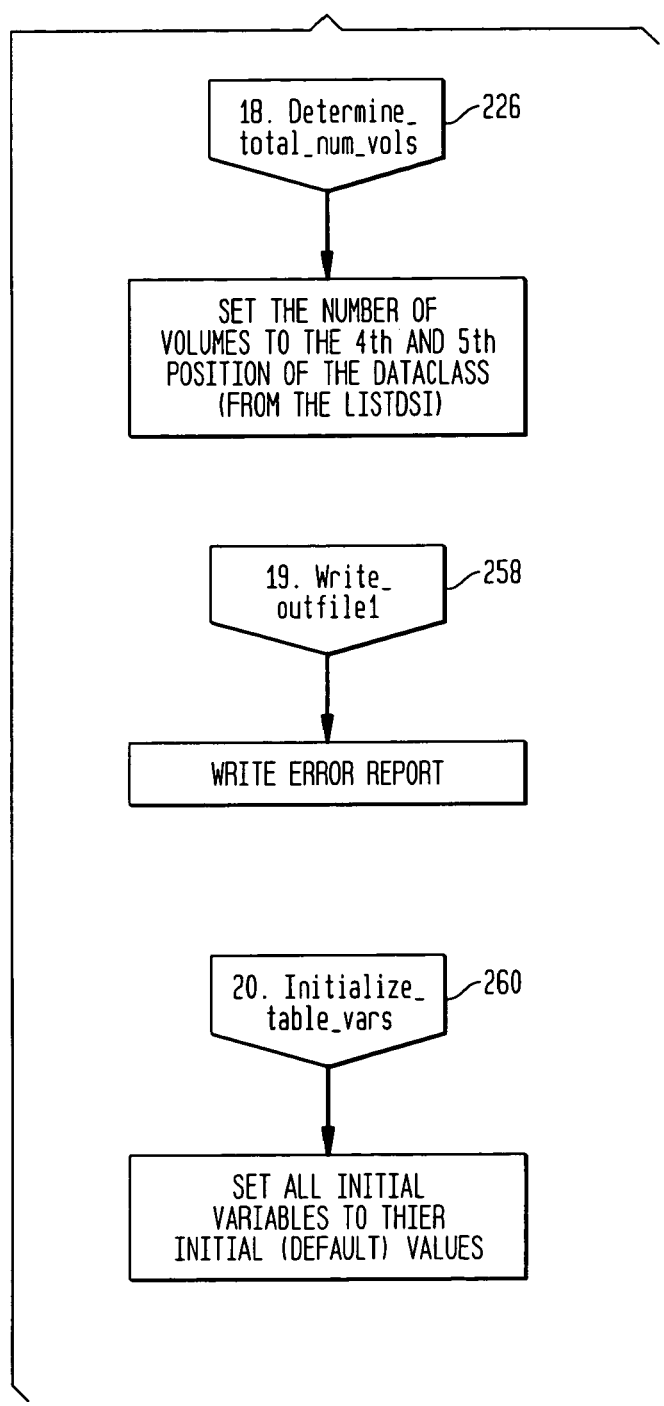
Figure 2M:
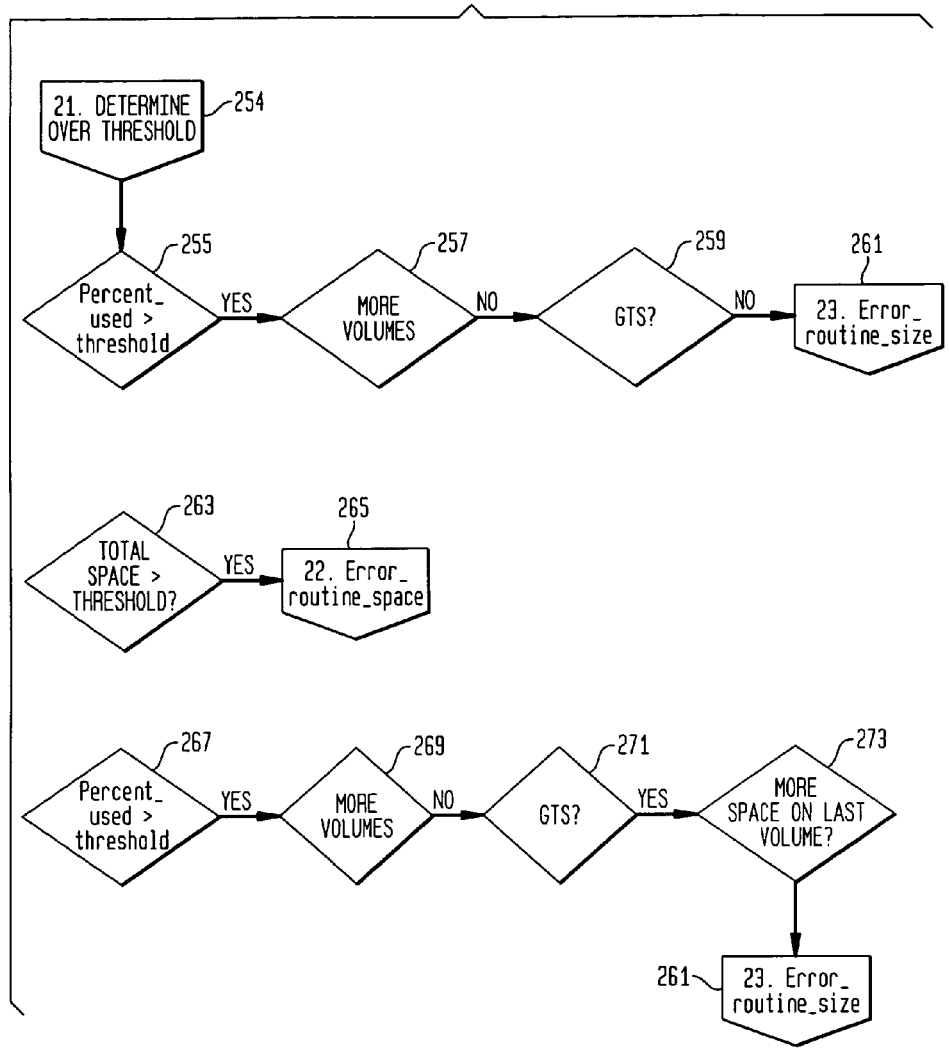
Figure 2N:
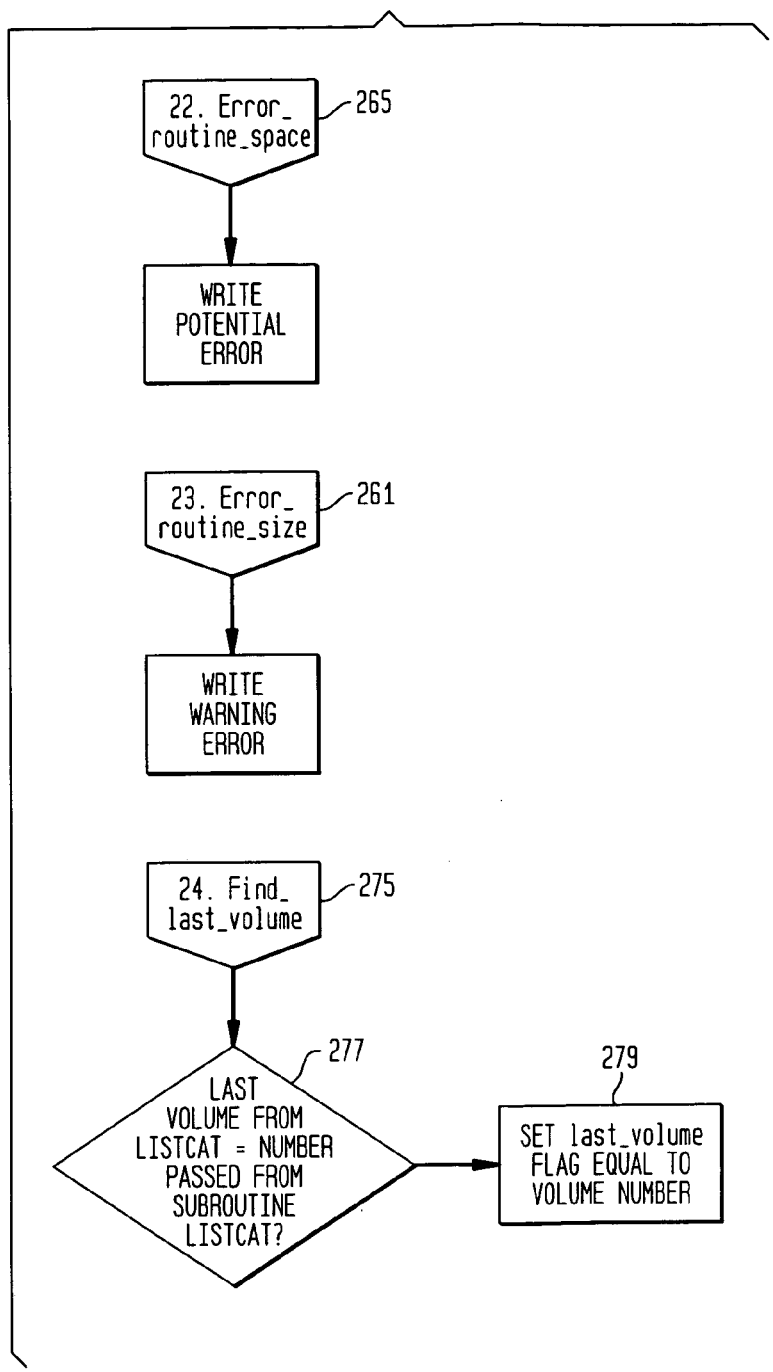
Figure 20:
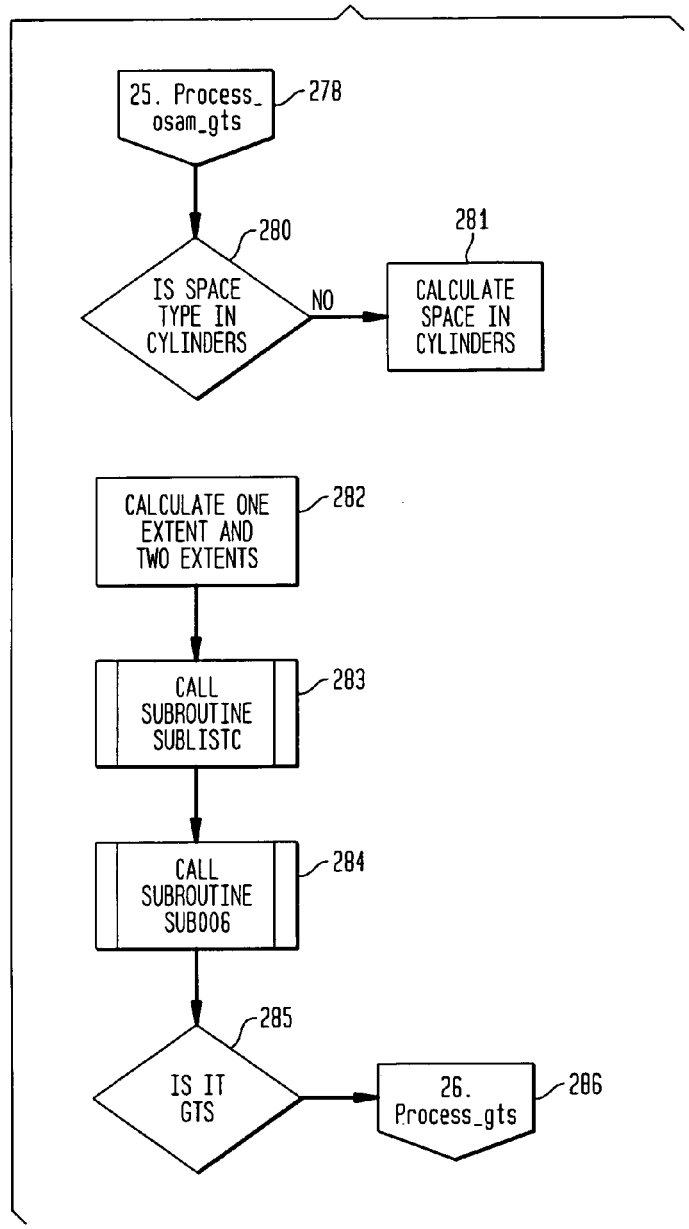
Figure 2P:
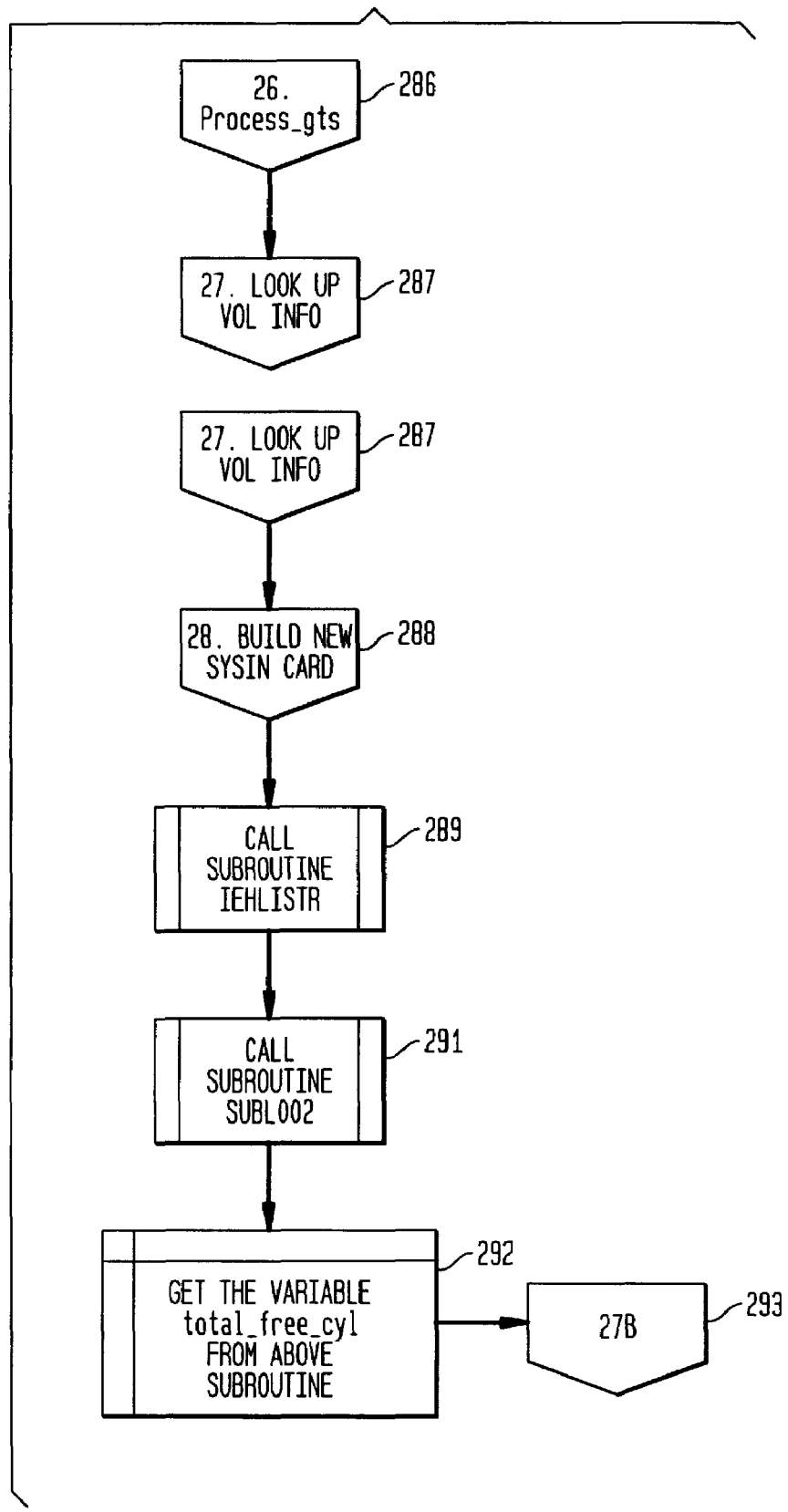
Figure 2Q:
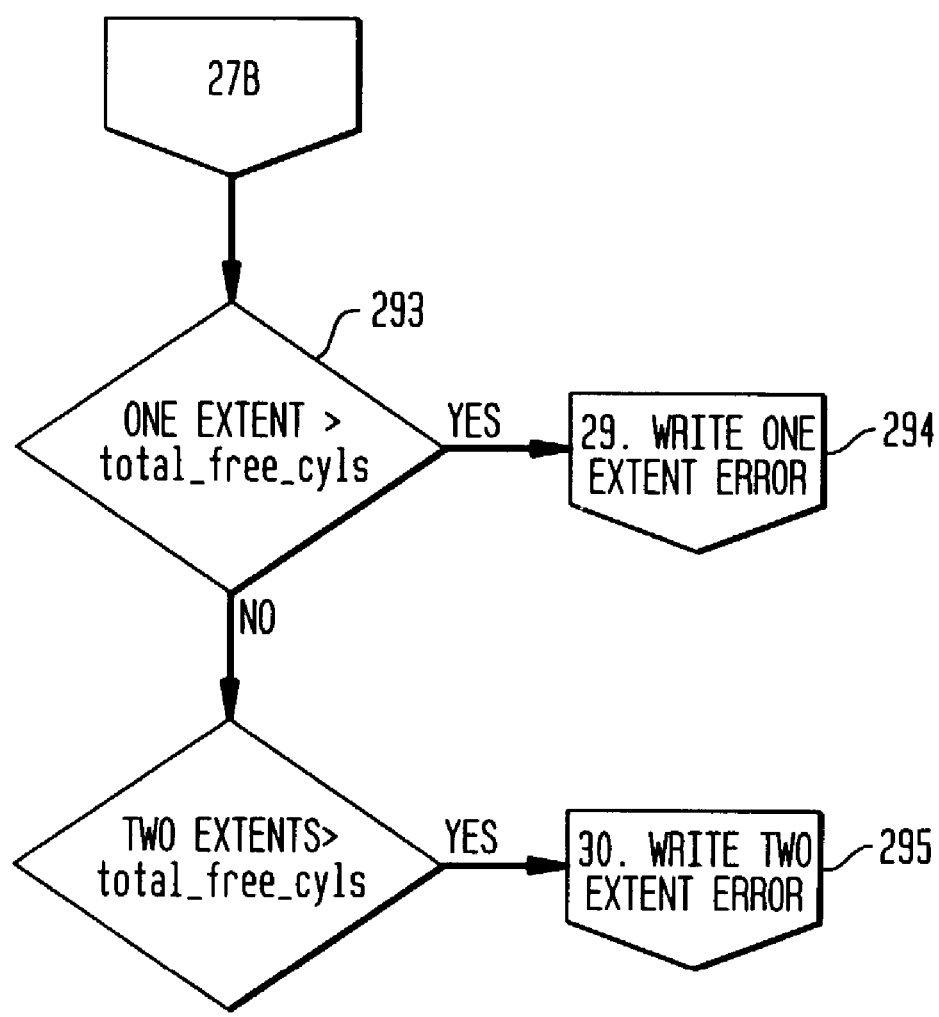
Figure 2R:
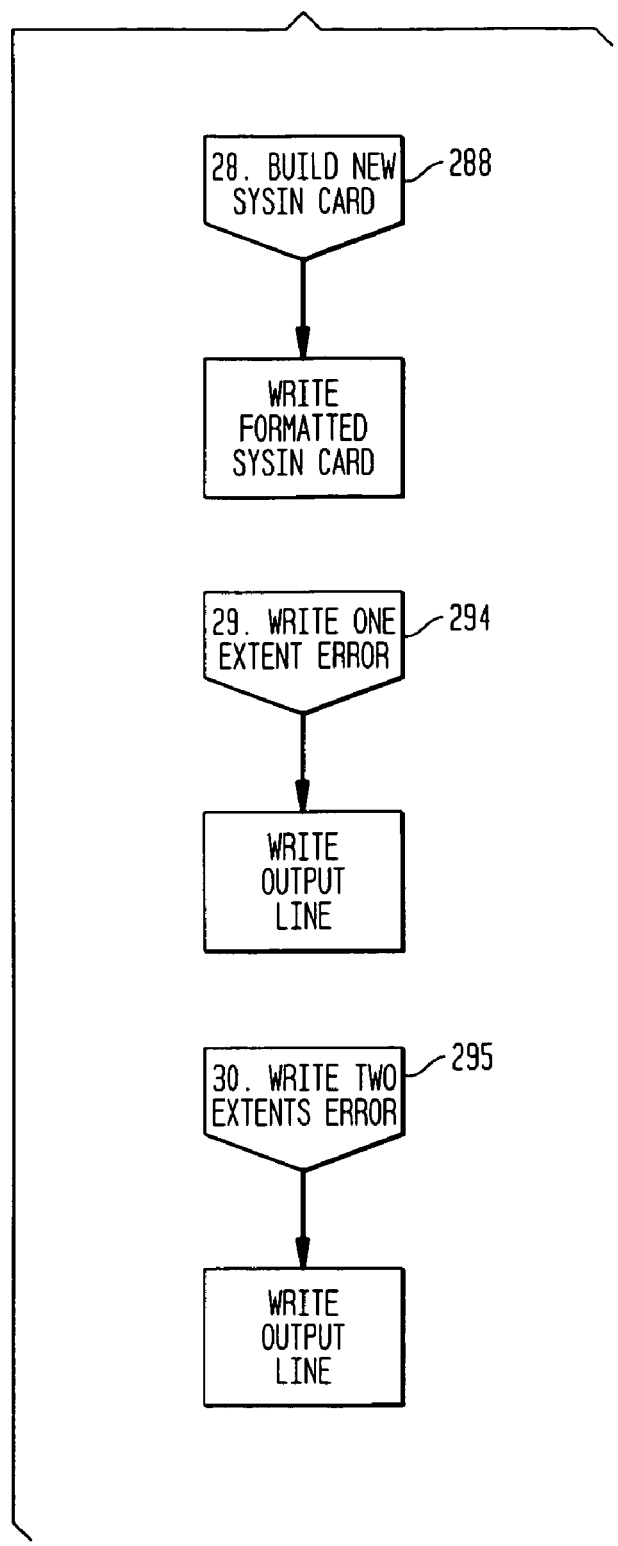
Figure 2S:
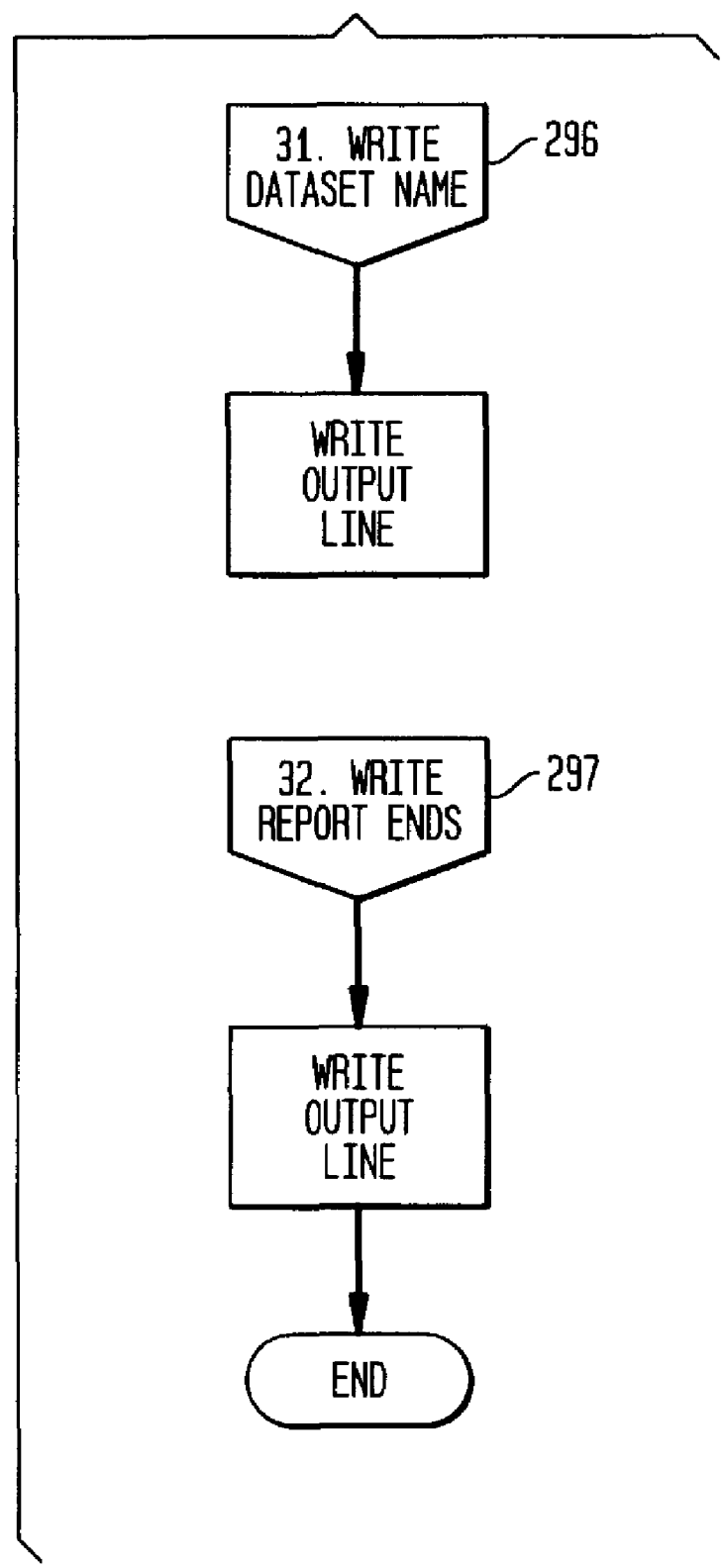

Turning to FIGS. 2A–2S, these figures show a process or module 200 for free space monitoring and report generation in accordance with the invention. Before discussing process 200 in detail, the following additional background regarding how IMS OSAM files are allocated is provided.

IMS OSAM datasets are physical sequential datasets. Guaranteed space is an attribute within SMS, and in some cases, this attribute is set on. This attribute changes the way that IMS allocates OSAM files, and further aspects of this attribute and allocation will be discussed further below. To determine if a dataset is guaranteed space (GTS) or not, an IDCAMS LISTCAT against the dataset is performed. If the dataset is GTS, according to a standard nomenclature of a preferred embodiment utilized by the present assignee, it will have a storage class that ends with the letters GTS, for example, STANTGTS.

DataClass is an SMS function and will give a default number of volumes that a dataset can be allocated across.

If the dataset is not guaranteed space, the following rules apply:
1. A primary extent will be taken on the first volume only.
2. Secondary extents will be taken after the primary is taken, even after an additional volume is used.
3. If a unit=(3390,n) is coded, where n is some number, that number of candidate volumes will override the SMS data class. For example, if the dataclass is vol5 (where a dataset would get 5 volumes) and unit=(3390, 2) is coded, only 2 volumes will be used. But, the number assigned cannot exceed the maximum allowed by SMS, so continuing with the vol5 example, if unit=(3390,9) is coded, only 5 volumes will be used.
4. A maximum of about 60 extents can be used because of IMS constraints. The maximum number of extents on any one volume is 16, but preferably it should be kept much lower than that, for example, 7.
5. ISPF 3.4 or ISMF can be used to display space allocations.

If the dataset is guaranteed space, the following rules apply:
1. A primary allocation will be taken on all volumes.
   a. If the volumes are coded, then a primary allocation will be taken on all of them.
   b. If the volumes are not coded, and a unit=(3390,n) is coded, a primary allocation will be taken in the GTS pool on the number of volumes coded. Such an allocation should not be done intentionally.

c. If the volumes are not coded, and there is no unit coded, then a primary allocation will be taken against the number of volumes from the data class. Again, such an allocation should not be done intentionally.

d. When converting to GTS from non-GTS, a user should be careful not to have the ACS routines changed before the defines are ready.

2. A secondary allocation will be taken and used on the volume in which the initial close occurred following a database load. For example, in the case of a first database, database 1, the close occurs on the last volume as determined by LISTCAT. Secondary allocations will only occur on that last volume after all of the primary is used on the other volumes. In the case of a second database, database2, the close occurs on the second volume. Secondary allocations will be taken and used before the last primary is used even though it is already allocated.

3. A maximum of 60 extents can be taken.

4. ISPF and ISMF cannot be reliably used for space determination. The DSCB's are not correctly updated by IMS as it was designed at the time the present invention was made.

Returning to FIGS. 2A–2S, process 200 illustrates how IMS allocates OSAM files and how IMS OSAM database space calculation and error detection are performed in accordance with the present invention. First, the external processes and subroutines are summarized below as follows:

External Processes:

1. IDCAMS DCOLLECT executes for every volume on the Sysplex. An external REXX routine extracts IMS datasets and builds only these files.
2. This file is sorted in dataset name order.
3. LISTCAT is a standard IDCAMS LISTCAT command.
4. IEHLIST is a utility that lists all of the data on a DASD device and how much free space is left.

Subroutines:

SUBLISTC 300 (FIG. 3)—issues an IDCAMS LISTCAT command for a dataset that was passed to it, and puts the results in a dataset.

SUB009 400 (FIGS. 4A–4C)—Reads the output from a SUBLISTC for a dataset and returns the following information—gts_flag, last volume, total number of volumes and 20 occurrences of volume serial numbers for a dataset.

SUB006 500 (FIGS. 5A–5C) Reads the output from a SUBLISTC and returns the following information—gts_flag and last volume.

IEHLISTR 600 (FIG. 6)—Dynamically executes an IEHLIST utility.

SUBL002 700 (FIGS. 7A and 7B)—Reads the output from the IEHLISTR subroutine and returns the following information—total free cylinders.

SUB006 500 (FIGS. 5A and 5B) Reads the output from a SUBLISTC and returns the following information—gts flag and last volume.

After process or module 200 starts after being called in step 201, the process begins by reading a first DCOLLECT record in step 202. Next, this first record is parsed for dataset name, volume serial or volser, allocated space and used space, in step 204. This information initially is determined from the external DCOLLECT process. If the dataset name is determined to be the same as the previous name in step 206, then process_same_dataset in step 208.

Otherwise, if the dataset name is determined to be not the same as the previous name in step 206, it is then determined in step 210 whether this is the first time this dataset has been encountered in this routine. If yes, then a first time process step 212 process_$_{first}$_time proceeds. Otherwise, the dataset is processed as a new dataset, process_new_dataset, in step 214. At step 216, process 200 determines if there are more records to be processed. If yes, the process proceeds back to step 202 and repeats. When there are no more records to be processed, the process proceeds to step 218 where write_report_ends causes a write report. Then, process 200 ends in step 290.

Returning to the process_first_time step 212, first all variables are initialized in an initialize all variables step 213. Next, total variables are initialized in an initialize total variables step 215, and then process 200 proceeds to process_same_dataset step 208. The process_new_dataset step 214 is followed by a write_out_dataset step 220. All variables are initialized in an initialize all variables step 222, which is in turn followed by a get_listdsi step 224. Next, a determine_total_num_vols operation is performed in step 226, which is followed by the process_same_dataset operation in step 208.

The PROCESS_SAME_DATASET step 208 adds one to an index and puts the variables from step 204 into a current entry list which has a maximum of 20 entries.

The write_out_dataset info step 220 begins with calling the SUBLISTC subroutine 300 SUBLISTC using dataset name. Subroutine 300 in turn proceeds to call subroutine 400 SUB009. These subroutines are described in further detail below in connection with the discussions of FIGS. 3 and 4A–4C, respectively. A get step 221 gts_flag and all_volsers from SUB009 400. The volsers are split in a split_volsers step 222 and then each item is processed serially in step 225. As used here, serial processing means that decision blocks 227, 229, and 231 are all processed serially, regardless of the answer to a preceding block. In step 227, it is determined if the variable used is all zeroes, if yes, then space is adjusted in an adjust_space step 228. If as part of serial processing step 225, it is determined in step 229 that if all zeroes and the volsers are out of sync, then ordinates are retrieved in a get_ordinates step 230. Alternatively, if an all zeroes determination is made at step 231, then a total_up_alloc step 232, followed by a total_up_used step 234, and a calc_percent_used step 236 result. Following serial processing step 225, a write blank line step 238 occurs. In step 240, if gts_flag ="YES", then a display or write message step 241 results. If the gts_flag ="NO", it is determined in step 242 if the number of candidates is greater than 90, then the display_message step 241 again results. If the number of candidates is not greater than 90 in step 242, the process proceeds to step 244 to calculate the number of volumes left based on data class, before proceeding to the write message step 241.

If it is determined in step 246 that the volumes are out of sync, then display message step 247 displays a message to this effect. If it is determined that the volumes are not out of sync in step 248, then a message to this effect is displayed in step 249. In step 250, it is determined whether there is space used. More particularly, if all zeroes is not =zeroes, there is space used. If space is used, then further_process_output step 251 proceeds. If not, a display message step 252 is followed by a determine_over_threshold step 254.

Returning to further_process_output step 251, a report line is formatted for each volser, and then these lines are written.

Returning to split_volsers step 223, all volsers from a subroutine are parsed to listcat_volser_tables, and a number_candidates step 233 determines the number of entries. If there are more than 20 entries, in other words, if there are more than 20 volumes, there is a more serious problem. In step 235, a write message provides an indication of this severe error as follows.

Adjust_space step 228 is followed by a decision step 237. If there are more than 20 volsers, then a message is played in response to write error step and the exit code is set to 16 indicative of a severe error. This process looks at the information from the LISTCAT and the DCOLLECT to make sure that the order is correct. It sets the used equal to the alloc based on a switch (found_end_vol). This switch is normally set off, and turned on when a non-zero value is found. If the found_end_vol switch is on, then the adjustment is ignored. This is because when there is a multi-volume OSAM dataset in IMS, the volumes prior to the initial close are set to null, and show zero, even if there is space used.

Returning to total_up_alloc step 232, this step adds alloc_space for each_volser. Similarly, total_up_used step 234 adds used_space for each_volser. Calc_percent_used step 236 calculates if the used_space and the alloc_space are not equal to zero, then the percent_used for volume is calculated.

With respect to get_ordinates step 230, it is determined if the volser entry =listcat_volser, by matching LISTCAT to DCOLLECT. Next, the order number is put in the order variable for the row.

Get_listdsi step 224 gets dataset information for directory, no-recall and smsinfo. LISTDSI is a standard REXX routine to determine dataset attributes.

Determine_total_num_vols step 226 strips out the fourth and fifth position from the data class and uses them as the number of volumes. This approach is a standard approach to determining the total number of volumes.

Write_outfile1 step 258 operates to write an error report.

Initialize_table_vars step 260 sets all initial variables back to base values.

Determine_over_threshold step 254 determines if percent_used is over a threshold in step 255, if there are no more volumes in step 257, and if it is not GTS in step 259. Having made these determinations, the process proceeds to an error routine size step 261.

Alternatively, if total space is over a threshold, then the process proceeds to an error_routine_space step 265.

Alternatively, if percent_used is over a threshold in step 267, it is next determined if there are no more volumes in step 269, if it is GTS in step 271, and if there is no more space on the last volume in step 273. Having made these determinations, the process 200 proceeds to error routine size step 261.

In error_routine_space step 265, a write potential error occurs. For error_routine_size step 261, a write warning error occurs.

For find_last_volume step 275, it is determined if the last volume in the LISTCAT is equal to the number passed from the subroutine LISTCAT in step 277. Then, the last_volume flag is set equal to that number in step 279.

For process_osam_gts step 278, if a space unit type is not in cylinders determination is made in step 280, then in step 281 current space is calculated into cylinder equivalent. A presently preferred approach to this calculation is based on secondary allocation. In this approach, it is determined how many cylinders are needed for 1 extent and for 2 extents in step 282. This is done to make the math processing a little quicker and to save a few lines of calculations. Subroutine SUBLISTC 300 is called in step 283.

Subroutine SUB006 500 is called in step 284. If it is GTS in step 285, then Process_GTS in step 286.

Process_gts step 286 looks up volume information look_up vol_info in step 287. Look_up_vol_info step 287 proceeds to build_new_sysin_card in step 288, calls subroutine IEHLISTR 600 in step 289, and calls subroutine SUBL002 700 in step 291. The above subroutines issue a dynamic IEHLIST that is used to determine how much free space is on a volume. In step 292, get_total_free_cyls. Based on how much free space is left on the volume, one of the two following error routines will be called: write_one_extent_error in step 294 or write_two_extents_error in step 295.

Build_new_sysin_card step 288 formats a sysin card for an IEHLIST utility that will be dynamically executed. Write_one_extent_error step 294 writes an output line. Write_two_extents_error step 295 writes an output line. Write_dataset_name step 296 writes an output line. Finally, write report ends 297 writes output lines for the ending reports.

Figure 3:
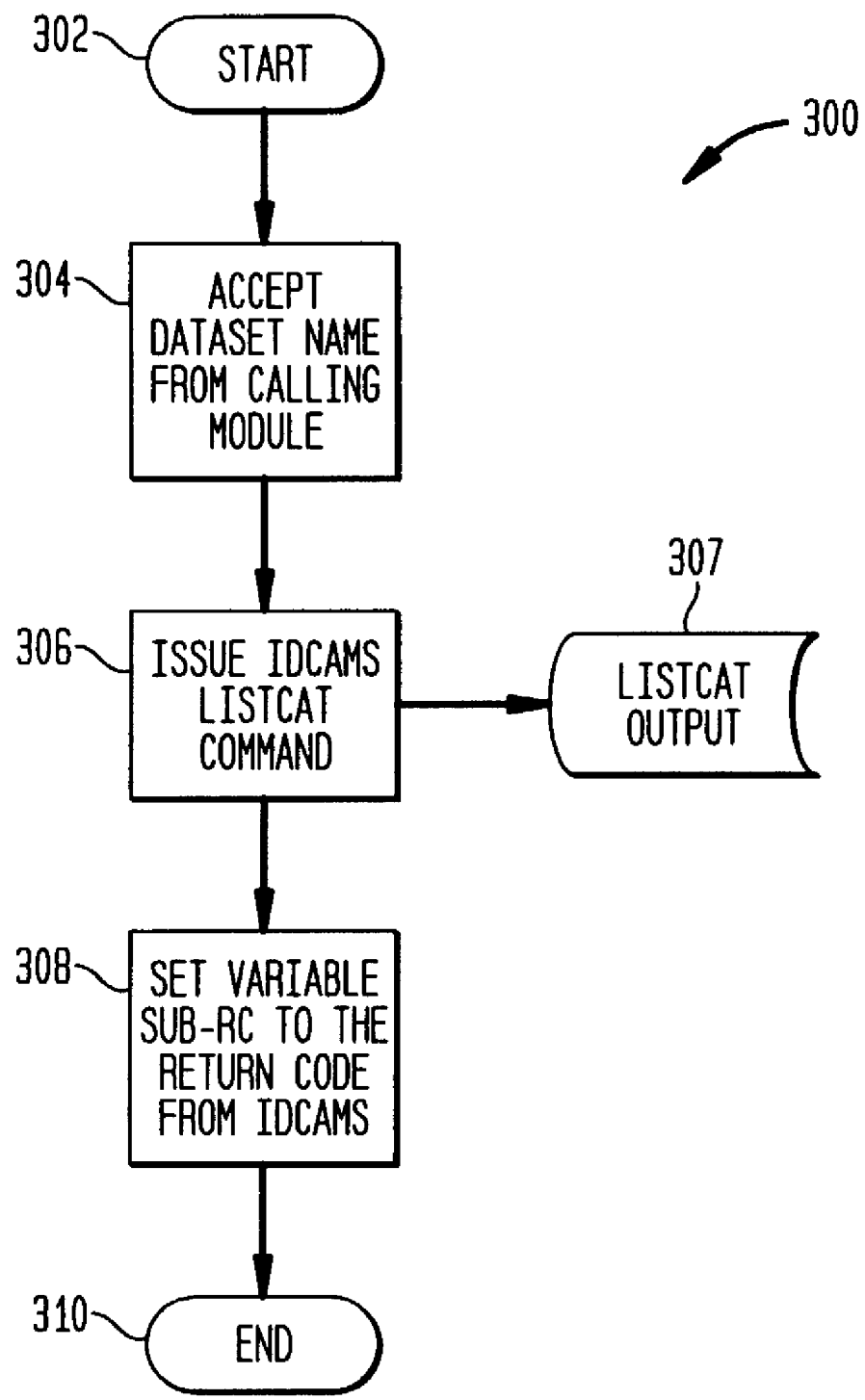
FIG. 3 is a flow chart for an exemplary SUBLISTC subroutine for use in conjunction with the method of FIGS. 2A–2S.

Next, we turn to FIGS. 3–7 to address in greater detail several presently preferred subroutines 300–700 for use in conjunction with process 200. FIG. 3 illustrates an exemplary subroutine SUBLISTC 300. This subroutine will execute an IDCAMS LISTCAT utility as a common subroutine based on information passed through a calling module or process, such as process 200. The result information will go to a work file for further processing by another routine. After starting in step 302 upon being called, the process flow proceeds to accept a dataset name from the calling module in step 304. An IDCAMS LISTCAT command is issued in step 306, putting the output to a work file, such as a listcat output in step 307. Next, a variable named sub_rc is set to the return code of this module so that the calling module can interrogate the results in step 308. Finally, subroutine 300 ends in step 310.

Figure 4A:
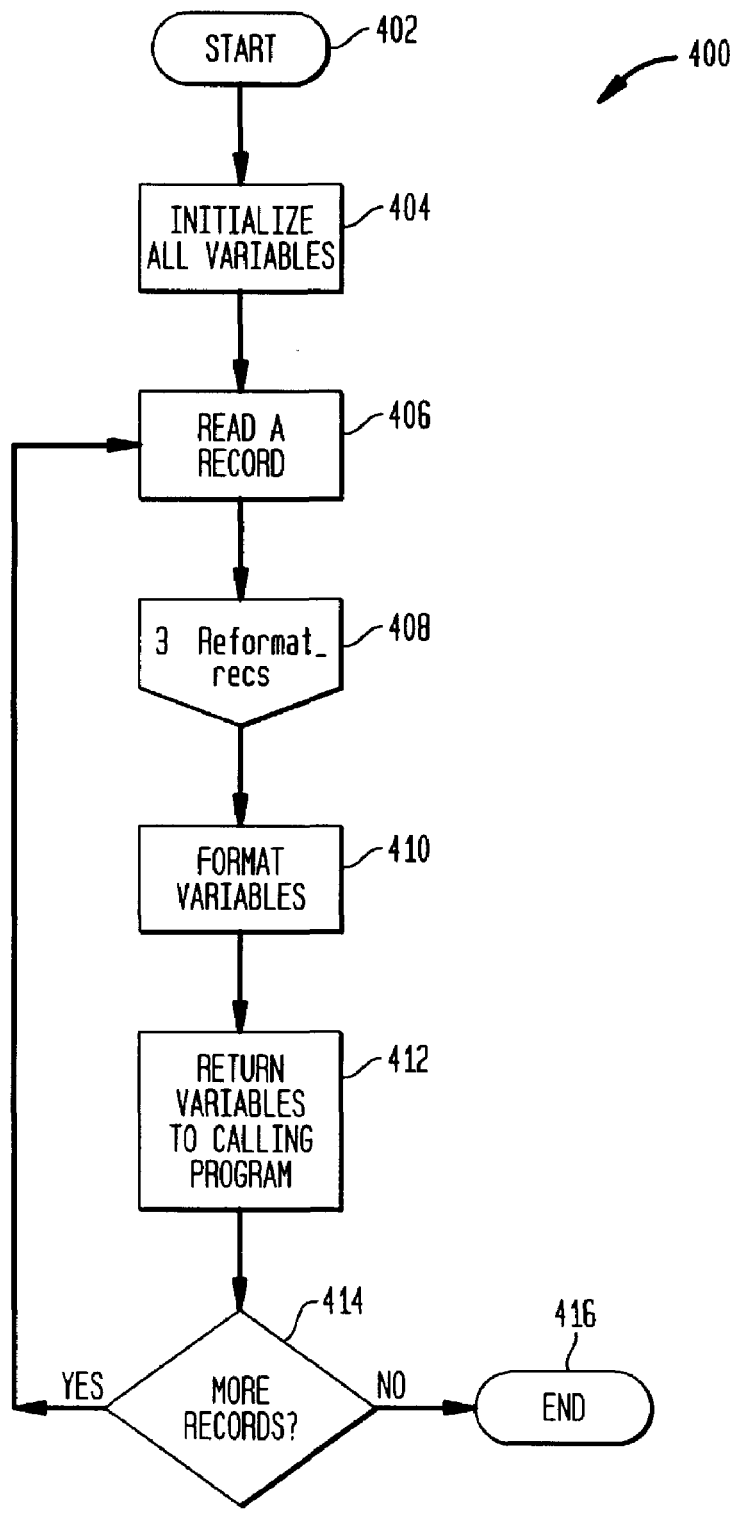
FIGS. 4A–4C are a flow chart illustrating an exemplary SUB009 subroutine for use in conjunction with the method of FIGS. 2A–2S.
Figure 4B:
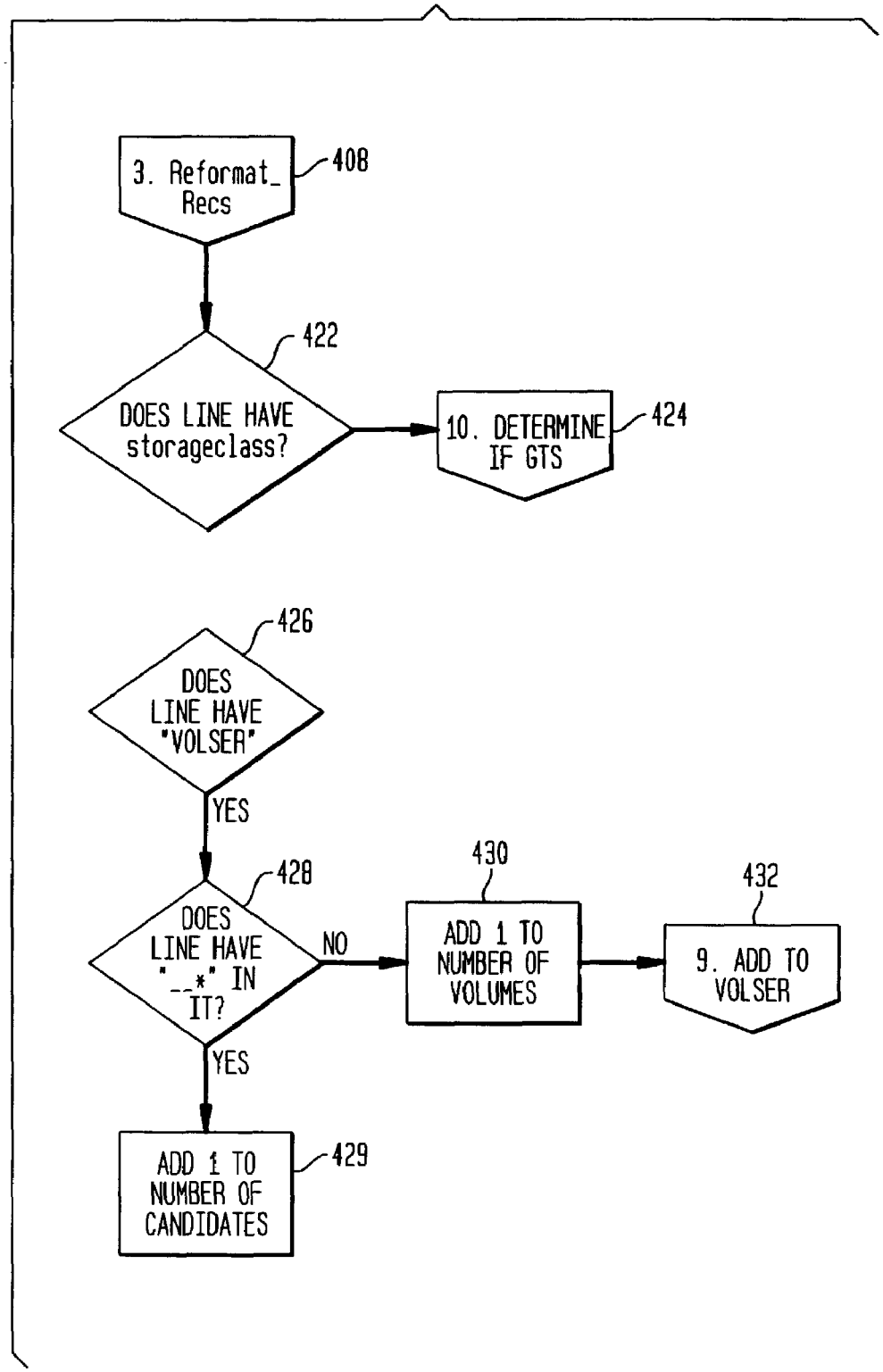
Figure 4C:
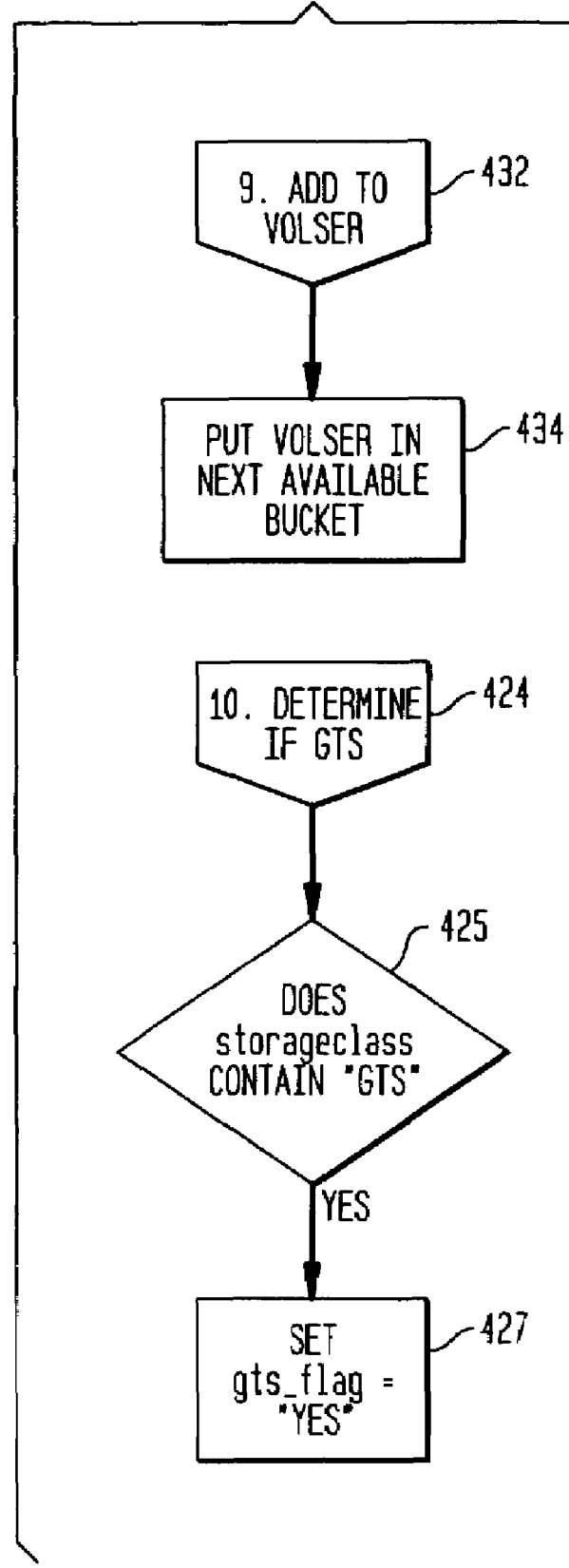

FIGS. 4A–4C are a flow chart illustrating further details of the presently preferred subroutine SUB009 400. This subroutine 400 is a common module that will read the output from the subroutine SUBLISTC 300. After it reads the file, it will pass back to the calling module if the volumes are guaranteed space (GTS), how many volumes are used, and what these volumes are. The process 400 proceeds as follows once it has started at step 402 after it has been called. First, all variables are initialized in step 404. Then, a first record is read in step 406. A reformat recs step 408 is done. Next, variables are formatted in a format variables step 410. The reformatted variables are returned to the calling module in a return variables to calling module step 412. If a record being reformatted in step 408 has dataclass or volser indicators, data is accumulated as shown in FIGS. 4B and 4C. In step 422, it is determined if a line has storage class data and it is determined in step 424 if it is guaranteed space or GTS. In step 425, storage class is analyzed to determine does it contain GTS and if yes, in step 427, the gts_flag is set to "YES". Returning to step 426, it is determined if a line has volser data. If yes, in step 428, the line is examined to see if it has "___*" in it. If no, in step 430, one is added to the number of volumes and in step 432, the line is added to the volser. In step 434, the volser is put in the next available bracket. If at step 428 the answer is yes, then in step 429, one is added to the number of candidates.

If there are additional records as determined in step 414, the process returns to step 408. An additional record is read and the process repeats until it is determined there are no additional records in step 414 and process 400 ends in step 416.

Figure 5A:
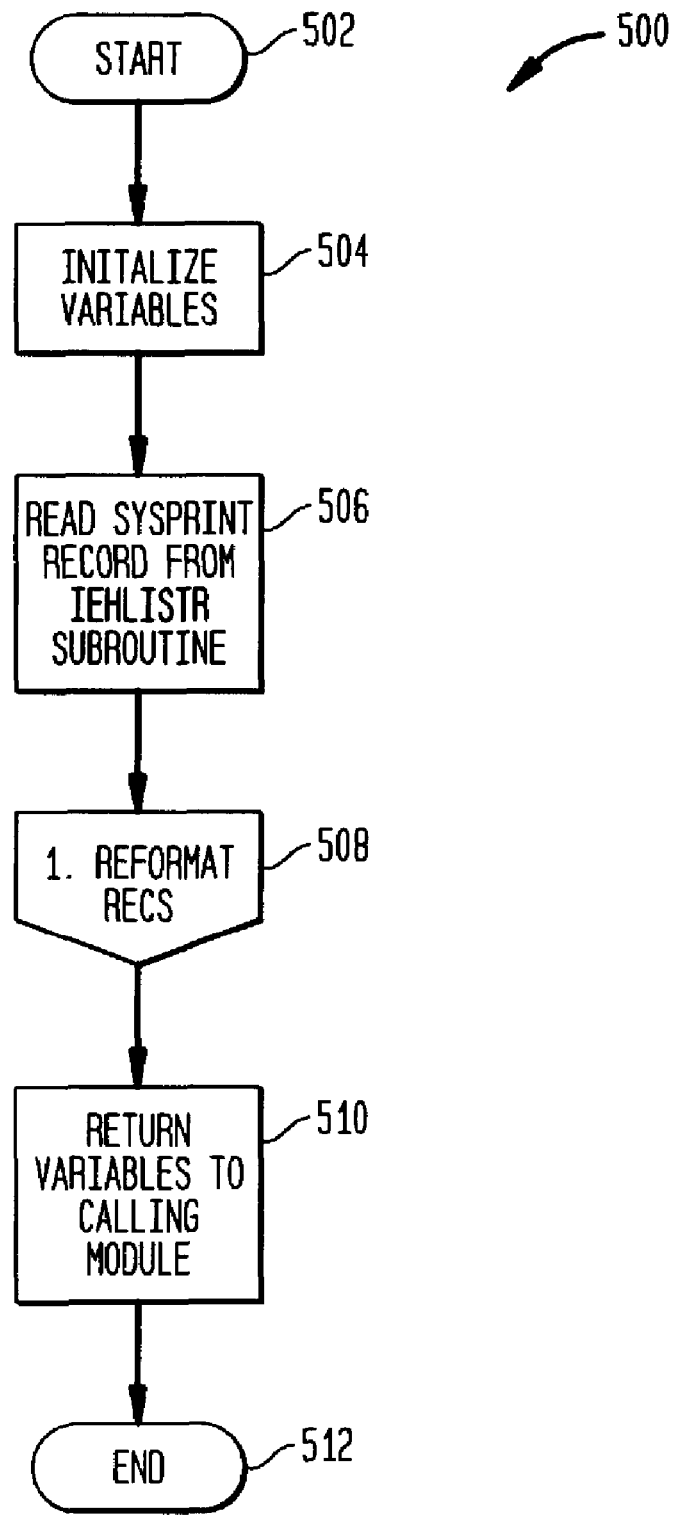
FIGS. 5A and 5B are a flow chart illustrating an exemplary SUB006 subroutine for use in conjunction with the method of FIGS. 2A–2S.
Figure 5B:
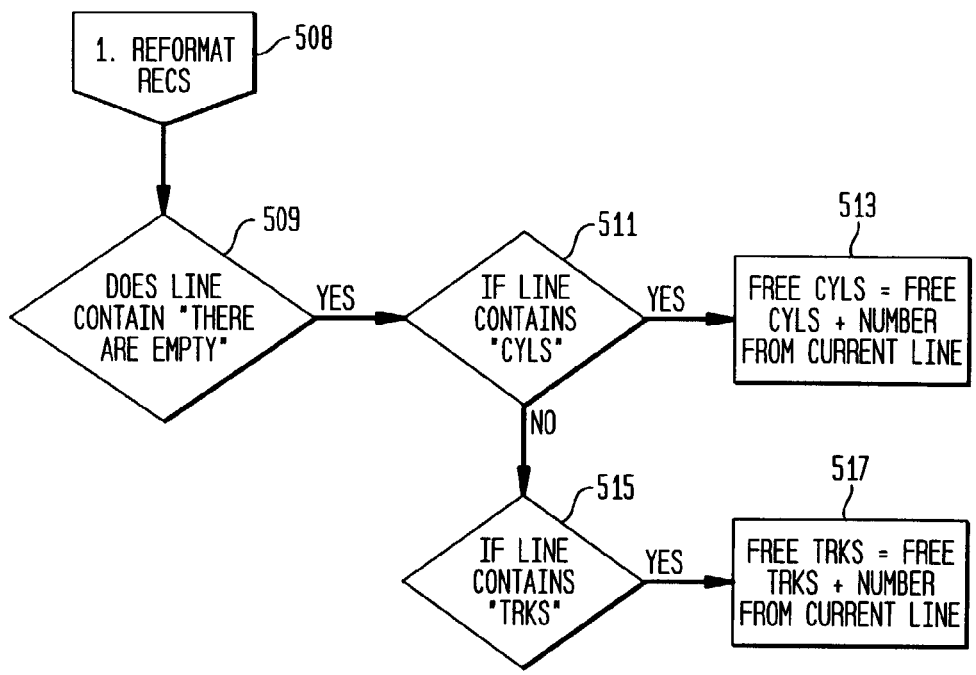

FIGS. 5A and 5B illustrate an exemplary subroutine SUB006 500 called by process 200. Having been called, subroutine 500 starts in step 502. Variables are initialized in initialize variables step 504. A sysprint record is read from the IEHLISTR subroutine 600, which is discussed further below, in step 506. The read record is reformatted in step 508 and the new variables for the reformatted record are returned to the calling module in step 510. Subroutine 500 ends in step 512.

Further details of a presently preferred approach to reformatting records in step 508 are shown in FIG. 5B. In step 509, it is determined if a line contains a statement "These are empty". If yes, if it is determined that the line contains cylinders in step 511, then in step 513, the free cylinders are established as being the number of free cylinders plus the number from the current line. If at step 511, it is determined that the line does not contain cylinders, then it is determined in step 515 if the line contains tracks "trks". If yes, the process proceeds to step 517 where the number of free tracks is established as the number of free tracks plus the number from the current line.

Figure 6:
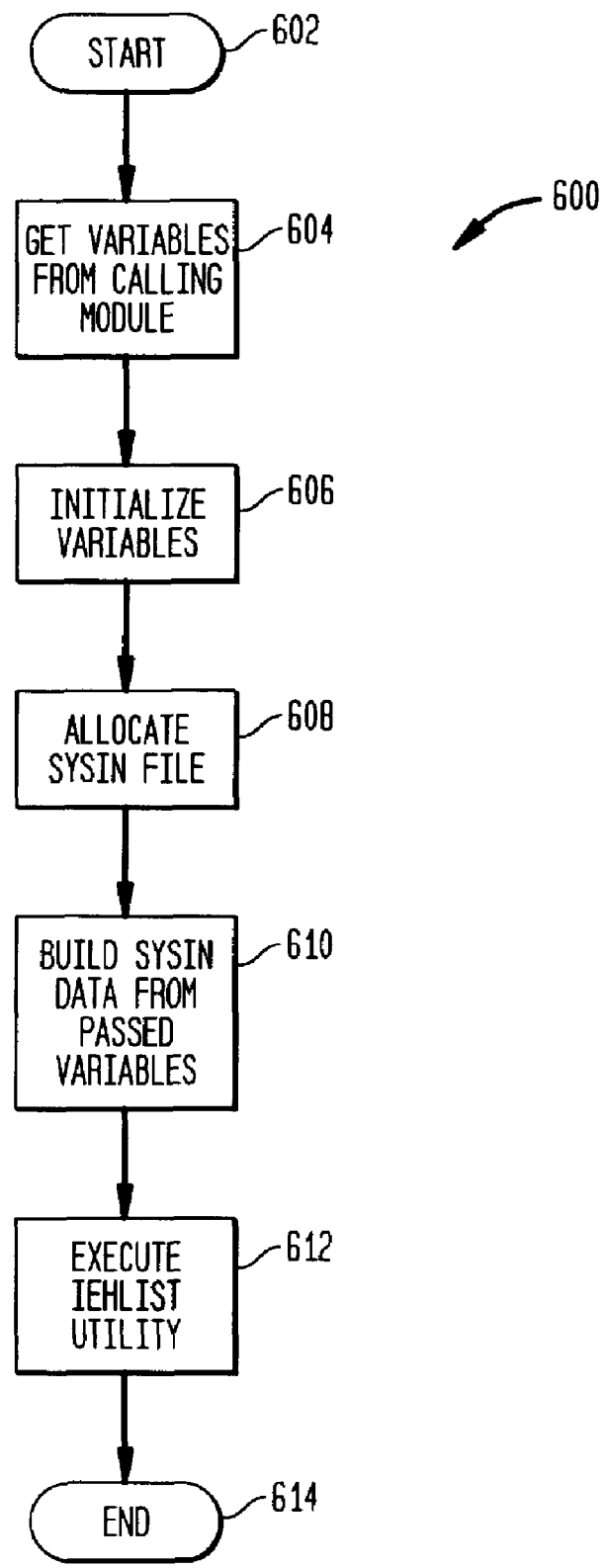
FIG. 6 illustrates an exemplary IEHLISTR subroutine for use in conjunction with the method of FIGS. 2A–2S.

FIG. 6 illustrates an exemplary IEHLISTR subroutine 600 called by process 200. Having been called, subroutine 600 starts in step 602. In step 604, subroutine 600 gets variables from the calling module. In step 606, these variables are initialized. In step 608, the sysin file is allocated. In step 610, sysin data is built from passed variables. Finally, in step 612, the IEHLIST utility is executed before subroutine 600 ends in step 614.

Figure 7A:
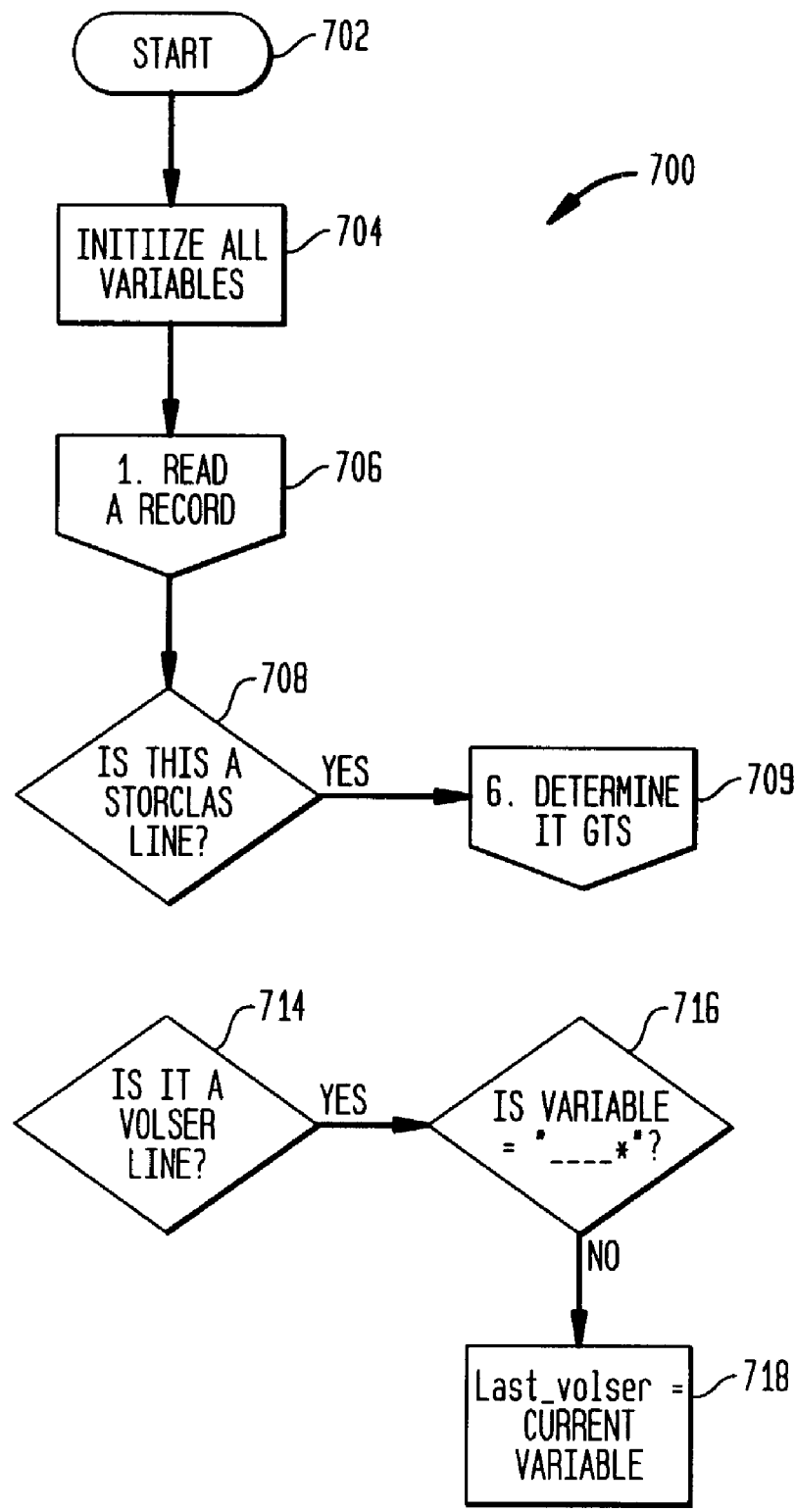
FIGS. 7A and 7B illustrate an exemplary SUBL002 subroutine for use in conjunction with the method of FIGS. 2A–2S.
Figure 7B:
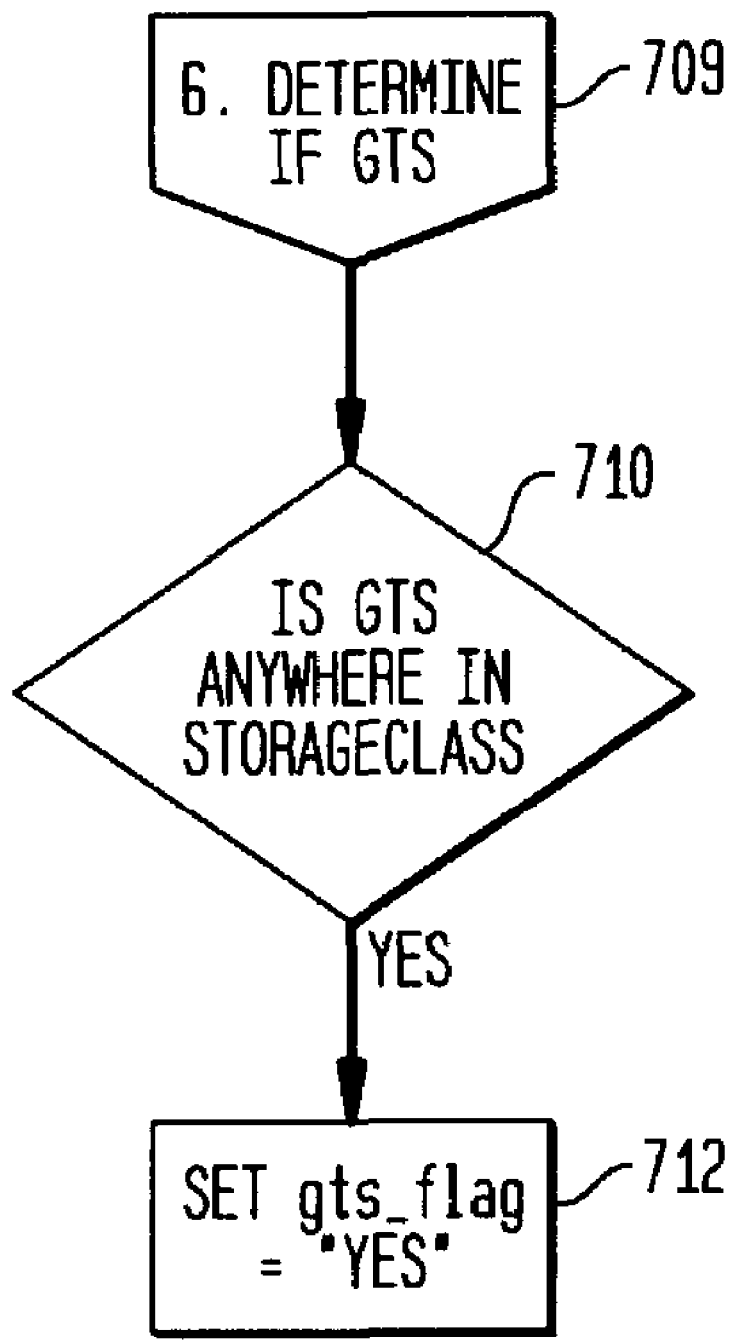

FIGS. 7A and 7B illustrate an exemplary subroutine SUBL002 700 called by process 200. Having been called, subroutine 700 starts in step 702. All variables are initialized in step 704. In step 706, a record is read. In step 708, it is determined if the record is a storage class or storclas line. If yes, it is determined in step 709 if the record is guarantee storage "GTS". In making this determination, in step 710, it is determined if there is GTS anywhere in the storage class for the record or line. If yes, in step 712, a GTS flag is set to "YES". In step 714, it is also determined if the record is a volser line. If yes, it is then determined in step 716 "Is variable="_____*"? If not, then the last volser is established as the current variable in step 718.

Finally, turning to exception reporting, FIG. 8 illustrates an exemplary email report 800 which is automatically forwarded to a user or users to provide them with a timely warning that a dataset has exceeded a predetermined threshold. In the exemplary report 800, the dataset name is indicated, for example, name 802. The total kilobytes (kb) allocated, for example, allocation data 804 and the total kb used, for example, used data 806, and percent used, for example, percent used data 808, are provided. It will be recognized that other formats of reports may be readily employed. With a report, such as report 800, the user can take remedial measures such as purging data from a dataset to reduce its size, splitting a dataset or the like before a system failure occurs.

While the present invention has been disclosed in the context of various aspects of presently preferred embodiments, it will be recognized that the invention may be suitably adapted to other environments and applications consistent with the claims which follow.

I claim:

1. A method for accurately determining information management system (IMS) database space for overflow sequential access method (OSAM) stored data files, the method comprising the steps of:
    storing a plurality of data files and transaction data in a database, the database spanning multiple disk storage volumes, each disk storage volume having an allocatable storage space and a measure of storage space utilized;
    monitoring the database during the storing of the plurality of data files to determine an order in which the multiple disk storage volumes are filled, the order determination comprising recognition of which of the multiple disk storage volumes is the last storage volume and recognition of one or more storage volumes preceding the last storage volume;
    determining for each of the multiple disk storage volumes a storage space utilized in the storing of the plurality of data files; and
    adjusting the measure of storage space utilized to full for the one or more storage volumes preceding the last storage volume.

2. The method of claim 1 further comprising the steps of:
    determining a total space stored for the plurality of data files from the measures of storage space utilized;
    determining if the total space exceeds a predetermined threshold which is a percentage of a summation of the allocatable storage space of each of the multiple disk storage volumes; and
    generating an exception report to inform a user that the total space exceeds the predetermined threshold.

3. The method of claim 2 further comprising the step of:
    automatically emailing the exception report to the user.

4. The method of claim 2 further comprising the step of:
    reducing the size of the database.

5. The method of claim 1 wherein the IMS OSAM data files are guaranteed space.

6. The method of claim 5 wherein said step of determining for each of the multiple disk storage volumes a storage space utilized in the storing of the plurality of data files further comprises:
    performing an IDCAMS LISTCAT against the data files to determine if the data files are guaranteed space.

7. The method of claim 5 wherein said step of determining for each of the multiple disk storage volumes a storage space utilized in the storing of the plurality of data files further comprises:
    executing a DCOLLECT utility against a volume table of contents on each of said disk storage volumes to extract information about the plurality of files stored on each disk.

8. The method of claim 5 wherein said step of monitoring further comprises:
    performing a SUBLISTC routine for the database and returning a gts flag, last volume, total number of volumes, and a predetermined number of occurrences of volume serial numbers for the database.

9. The method of claim 8 wherein said step of monitoring further comprises:
    reading an output from the SUBLISTC routine and returning gts flag and last volume information.

10. The method of claim 5 further comprising the step of:
    executing an IEHLISTR routine.

11. The method of claim 10 further comprising the steps of:
- reading an output from the IEHLISTR subroutine; and
- returning total free cylinder information.

12. A method for accurately determining information management system (IMS) database space for overflow sequential access method (OSAM) stored data files, the method comprising the steps of:
- means for storing a plurality of data files and transaction data in a database, the database spanning multiple disk storage volumes, each disk storage volume having an allocatable storage space and a measure of storage space utilized;
- means for monitoring the database during the storing of the plurality of data files to determine an order in which the multiple disk storage volumes are filled, the order determination comprising recognition of which of the multiple disk storage volumes is the last storage volume and recognition of one or more storage volumes preceding the last storage volume;
- means for determining for each of the multiple disk storage volumes a storage space utilized in the storing of said plurality of data files; and
- means for adjusting the measure of storage space utilized to full for the one or more storage volumes preceding the last storage volume.

13. The apparatus of claim 12, further comprising:
- means for determining a total space stored for the plurality of data files from the measures of storage space utilized;
- means for determining if the total space exceeds a predetermined threshold which is a percentage of a summation of the allocatable storage space of each of the multiple disk storage volumes; and
- means for generating an exception report to inform a user that the total space exceeds the predetermined threshold.

14. The apparatus of claim 13 further comprising:
means for automatically emailing the exception report to the user.

15. The apparatus of claim 14 further comprising:
a display to display the exception report.

16. The apparatus of claim 13 wherein the IMS OSAM data files are guaranteed space and the multiple disk storage volumes are part of a multiple virtual storage mainframe computer system.

17. The apparatus of claim 16 wherein said means for determining for each of the multiple disk storage volumes a storage space utilized in the storing of said plurality of data files further comprises:
- means for performing an IDCAMS LISTCAT against the data files to determine if the data files are guaranteed space.

18. The apparatus of claim 16 wherein said means for determining for each of the multiple disk storage volumes a storage space utilized in the storing of said plurality of data files further comprises:
- means for executing a DCOLLECT utility against a volume table of contents on each of said disk storage volumes to extract information about the plurality of files stored on each disk.

19. The apparatus of claim 16 wherein said means for monitoring further comprises:
- means for performing a SUBLISTC routine for the database and returning a gts flag, last volume, total number of volumes, and a predetermined number of occurrences of volume serial numbers for the database.

20. The apparatus of claim 19 wherein said means for monitoring further comprises:
- means for reading an output from the SUBLISTC routine; and
- means for returning gts flag and last volume information.

21. The apparatus of claim 16 further comprising:
means for executing an IEHLISTR routine.

22. The apparatus of claim 21 further comprising:
- means for reading an output from the IEHLISTR subroutine; and
- means for returning total free cylinder information.

23. The method of claim 1 wherein a data file of the plurality of data files is a sequential data file including transaction data.

* * * * *